(12) United States Patent
Mitani et al.

(10) Patent No.: US 12,537,376 B2
(45) Date of Patent: Jan. 27, 2026

(54) ELECTRICAL POWER SUPPLY SYSTEM AND METHOD OF CONTROLLING ELECTRICAL POWER SUPPLY SYSTEM

(71) Applicant: HONDA MOTOR CO., LTD., Tokyo (JP)

(72) Inventors: Manabu Mitani, Wako (JP); Minato Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/985,673

(22) Filed: Dec. 18, 2024

(65) Prior Publication Data

US 2025/0219405 A1  Jul. 3, 2025

(30) Foreign Application Priority Data

Dec. 27, 2023 (JP) .................. 2023-220741

(51) Int. Cl.
    *H02J 1/10* (2006.01)
    *H02J 1/08* (2006.01)

(52) U.S. Cl.
    CPC .............. *H02J 1/106* (2020.01); *H02J 1/084* (2020.01)

(58) Field of Classification Search
CPC . B60R 16/03; B60R 16/0207; B60R 16/0231; B60R 16/023; B60R 16/0238; B60R 16/0239; B60R 16/0315; H04B 3/548
See application file for complete search history.

(56) References Cited

U.S. PATENT DOCUMENTS

| 2012/0150372 | A1 | 6/2012 | Chiang et al. |
| 2015/0183325 | A1* | 7/2015 | Mitsutani ............ B60L 58/12 |
| | | | 307/10.1 |
| 2019/0115176 | A1* | 4/2019 | Yasunori ............ B60R 16/03 |
| 2019/0126866 | A1* | 5/2019 | Sato ................ H02J 7/0031 |

(Continued)

FOREIGN PATENT DOCUMENTS

| JP | 2010-141958 A | 6/2010 |
| JP | 5014923 B2 | 8/2012 |

OTHER PUBLICATIONS

Extended European Search Report dated Apr. 11, 2025 issued in corresponding European application No. 24222102.6 (10 pages).

*Primary Examiner* — Lincoln D Donovan
*Assistant Examiner* — Alex W Lam
(74) *Attorney, Agent, or Firm* — Rankin, Hill & Clark LLP

(57) ABSTRACT

In an electrical power supply system, when a terminal voltage of a first electrical power storage device is higher than that of a second electrical power storage device, an electrical power generating device and a first load device are electrically disconnected, and the electrical power generating device and the first electrical power storage device are electrically disconnected, thereby charging a smoothing capacitor of the first load device by the electrical power supplied from the first electrical power storage device, and the electrical power generating device and a second load device are electrically connected, and the electrical power generating device and the second electrical power storage device are electrically connected, thereby charging a smoothing capacitor of the electrical power generating device and a smoothing capacitor of the second load device by the electrical power supplied from the second electrical power storage device.

6 Claims, 20 Drawing Sheets

(56) References Cited

U.S. PATENT DOCUMENTS

2022/0263337 A1    8/2022  Mitani et al.
2022/0311334 A1*  9/2022  Mitani ................ H02J 7/0063
2023/0327432 A1  10/2023  Mitani et al.

* cited by examiner

Time t1

Time t4

Time t6

Time t7

Time t8

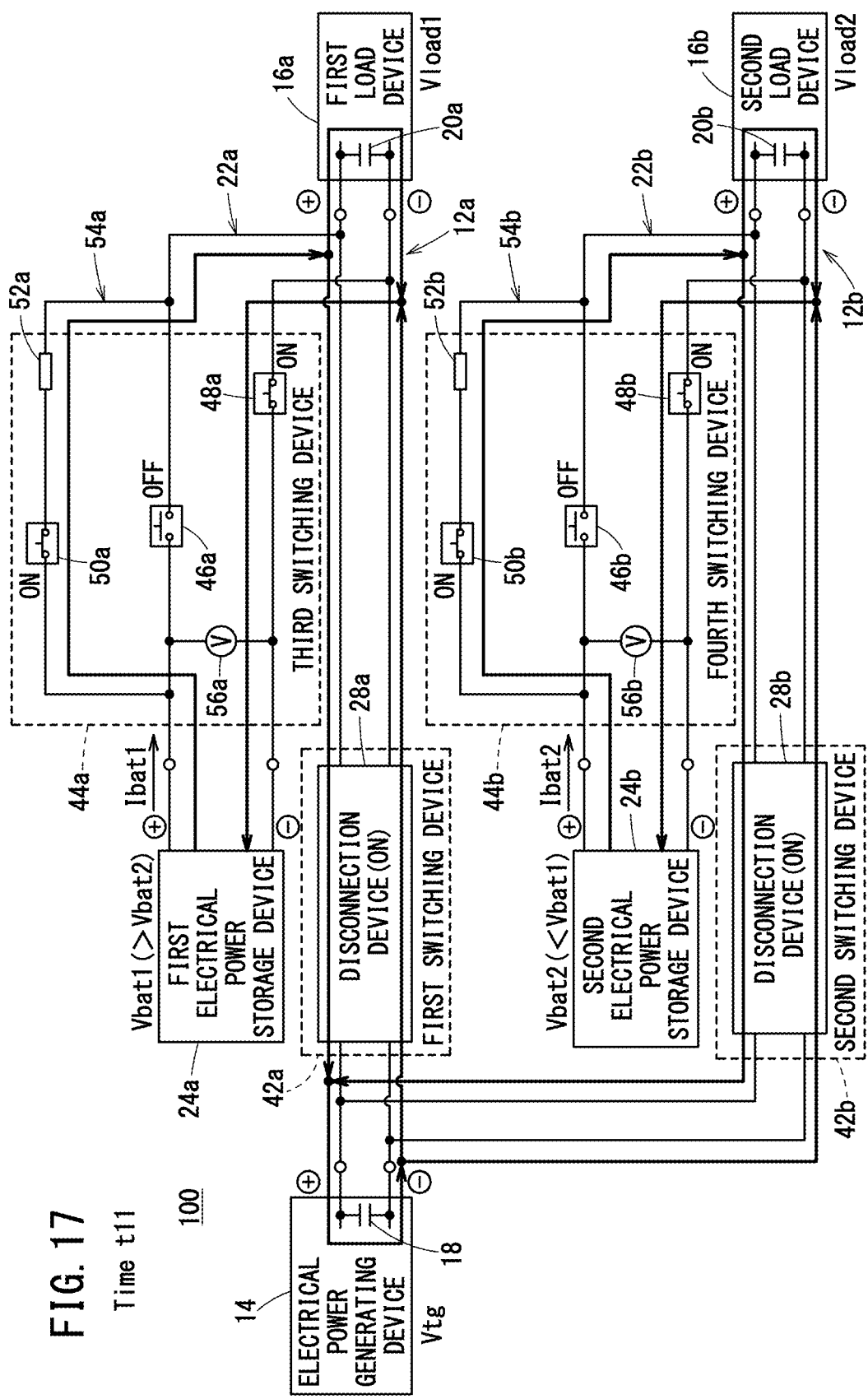

Time t12

Time t13

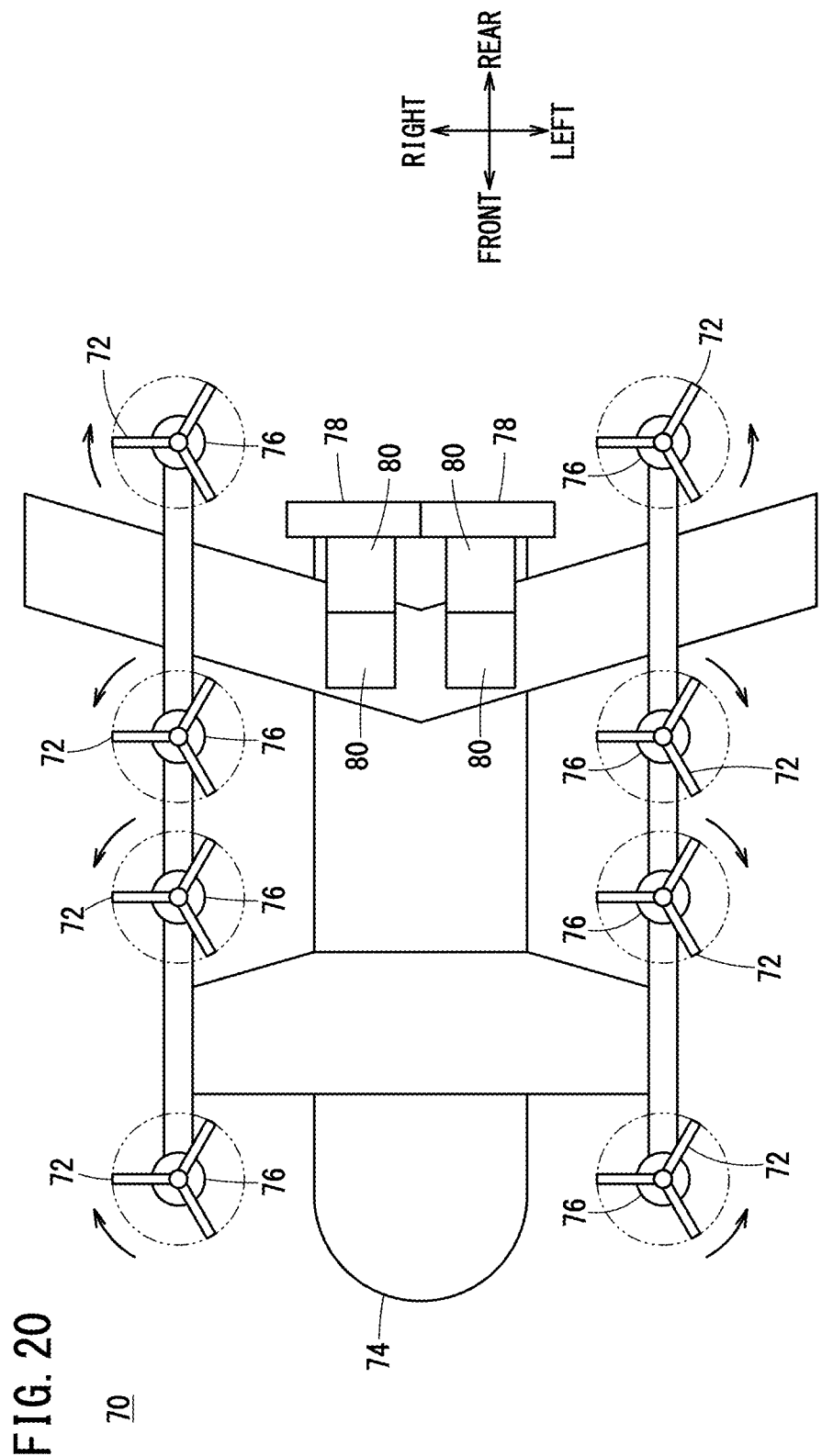

ELECTRICAL POWER SUPPLY SYSTEM AND METHOD OF CONTROLLING ELECTRICAL POWER SUPPLY SYSTEM

CROSS-REFERENCE TO RELATED APPLICATIONS

This application is based upon and claims the benefit of priority from Japanese Patent Application No. 2023-220741 filed on Dec. 27, 2023, the contents of which are incorporated herein by reference.

BACKGROUND OF THE INVENTION

Field of the Invention

The present disclosure relates to an electrical power supply system and a method of controlling an electrical power supply system.

Description of the Related Art

In JP 2010-141958 A, an electrical power supply system is disclosed which is equipped with a high-voltage battery and a motor generator. Three relays, a resistor (a precharging resistor), a capacitor (a smoothing capacitor), and a step-down converter are interposed between the high-voltage battery and the motor generator. In such an electrical power supply system, by controlling the ON and OFF states of the three relays, precharging of the capacitor can be carried out via the resistor. Further, in such an electrical power supply system, by controlling the ON and OFF states of the three relays, an electrical charge that is accumulated in the capacitor can be discharged via the resistor.

SUMMARY OF THE INVENTION

There is a desire for a more satisfactory electrical power supply system and a method of controlling such an electrical power supply system.

The present invention has the object of solving the aforementioned problem.

A first aspect of the present disclosure is characterized by an electrical power supply system, comprising a first load device including a smoothing capacitor, a second load device including a smoothing capacitor, an electrical power generating device including a smoothing capacitor, and configured to supply electrical power to the first load device and the second load device, a first electrical power storage device connected in parallel with the electrical power generating device, and configured to supply electrical power to the first load device, a second electrical power storage device connected in parallel with the electrical power generating device, and configured to supply electrical power to the second load device, a first switching device configured to switch between a first state in which, together with the electrical power generating device and the first load device being electrically connected, the electrical power generating device and the first electrical power storage device are electrically connected, and a second state in which, together with the electrical power generating device and the first load device being electrically disconnected, the electrical power generating device and the first electrical power storage device are electrically disconnected, a second switching device configured to switch between a third state in which, together with the electrical power generating device and the second load device being electrically connected, the electrical power generating device and the second electrical power storage device are electrically connected, and a fourth state in which, together with the electrical power generating device and the second load device being electrically disconnected, the electrical power generating device and the second electrical power storage device are electrically disconnected, a voltage acquisition unit configured to acquire a first voltage which is a terminal voltage of the first electrical power storage device, and a second voltage which is a terminal voltage of the second electrical power storage device, and a control unit configured to control the first switching device and the second switching device, wherein, in a case that the first voltage is higher than the second voltage, the control unit sets the first switching device to the second state and sets the second switching device to the third state, thereby charging the smoothing capacitor of the first load device by the electrical power supplied from the first electrical power storage device, and charging the smoothing capacitor of the electrical power generating device and the smoothing capacitor of the second load device by the electrical power supplied from the second electrical power storage device.

A second aspect of the present disclosure is characterized by a method of controlling an electrical power supply system, the electrical power supply system comprising a first load device including a smoothing capacitor, a second load device including a smoothing capacitor, an electrical power generating device including a smoothing capacitor, and configured to supply electrical power to the first load device and the second load device, a first electrical power storage device connected in parallel with the electrical power generating device, and configured to supply electrical power to the first load device, a second electrical power storage device connected in parallel with the electrical power generating device, and configured to supply electrical power to the second load device, a first switching device configured to switch between a first state in which, together with the electrical power generating device and the first load device being electrically connected, the electrical power generating device and the first electrical power storage device are electrically connected, and a second state in which, together with the electrical power generating device and the first load device being electrically disconnected, the electrical power generating device and the first electrical power storage device are electrically disconnected, and a second switching device configured to switch between a third state in which, together with the electrical power generating device and the second load device being electrically connected, the electrical power generating device and the second electrical power storage device are electrically connected, and a fourth state in which, together with the electrical power generating device and the second load device being electrically disconnected, the electrical power generating device and the second electrical power storage device are electrically disconnected, the method of controlling the electrical power supply system comprising a voltage acquisition step of acquiring a first voltage which is a terminal voltage of the first electrical power storage device, and a second voltage which is a terminal voltage of the second electrical power storage device, and a precharging step of, in a case that the first voltage is higher than the second voltage, setting the first switching device to the second state and setting the second switching device to the third state, thereby charging the smoothing capacitor of the first load device by the electrical power supplied from the first electrical power storage device, and charging the smoothing capacitor of the electrical power generating device and the smoothing capacitor of the second load device by the electrical power supplied from the second electrical power storage device.

According to the present invention, it is possible to provide a more satisfactory electrical power supply system and a method of controlling such an electrical power supply system.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 17 is a diagram showing a state of the electrical power supply system according to the comparative example;

FIG. 20 is a schematic diagram of a moving object.

DETAILED DESCRIPTION OF THE INVENTION

In an electrical power supply system that supplies electrical power from an electrical power generating device to a first load device and a second load device, a first electrical power storage device may be connected in parallel with the electrical power generating device, and a second electrical power storage device may be connected in parallel with the electrical power generating device. In accordance with this feature, in the case that a comparatively large amount of electrical power is requested from the first load device, the electrical power is supplied to the first load device from the electrical power generating device and the first electrical power storage device. Further, in the case that a comparatively large amount of electrical power is requested from the second load device, the electrical power is supplied to the second load device from the electrical power generating device and the second electrical power storage device. However, in the case that a difference between the output voltage of the first electrical power storage device and the output voltage of the second electrical power storage device is comparatively large, a concern arises in that an excessive electrical current may flow to the electrical power supply system.

The electrical power supply system and the method of controlling the electrical power supply system disclosed herein are capable of suppressing the occurrence of an excessive electrical current in the electrical power supply system, even in the case that a difference occurs between the output voltage of the first electrical power storage device and the output voltage of the second electrical power storage device.

Embodiment

[Configuration of Electrical Power Supply System]

Figure 1:
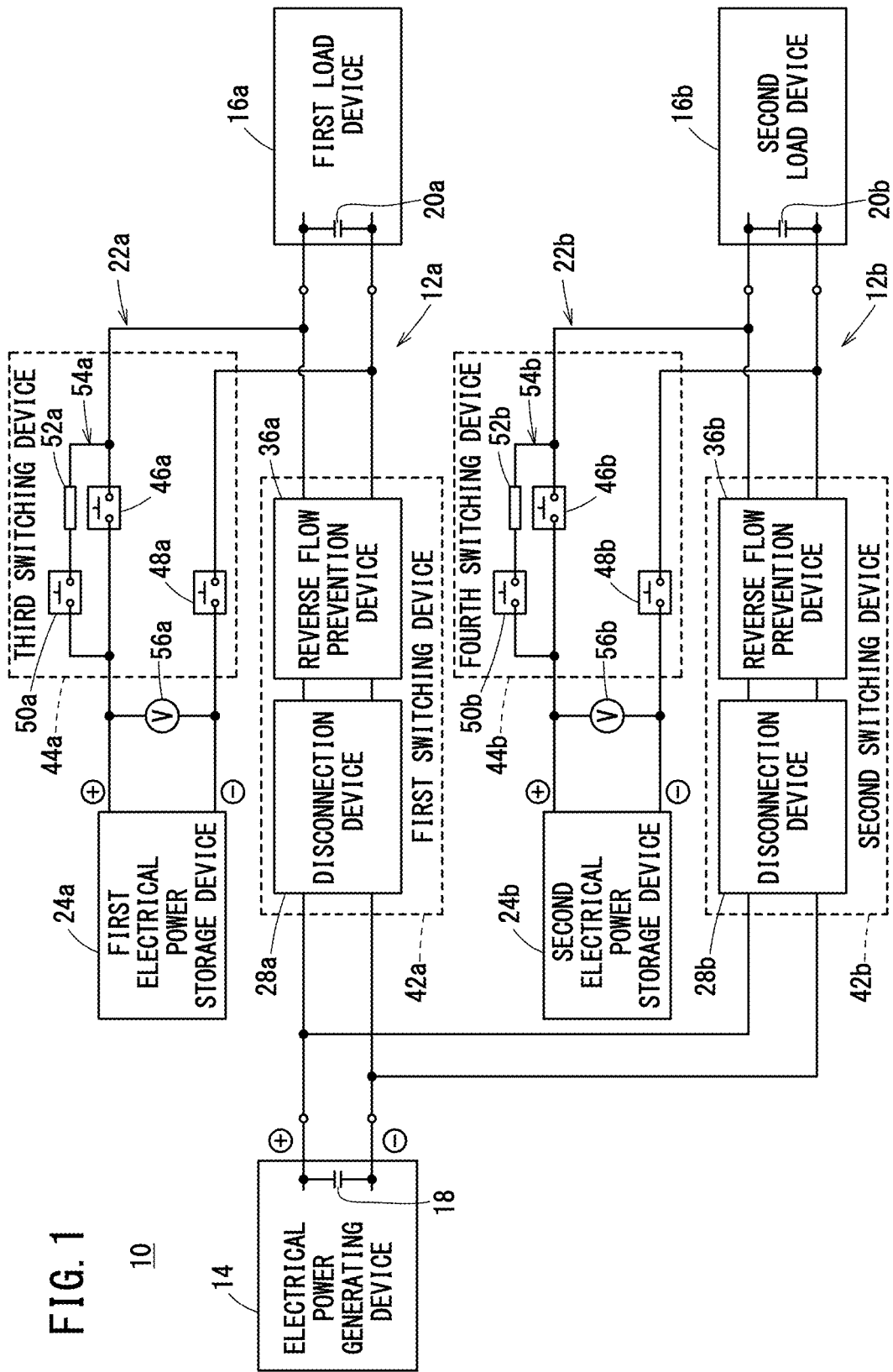
FIG. 1 is a schematic diagram of an electrical power supply system according to a present embodiment.

FIG. 1 is a schematic diagram of an electrical power supply system 10 according to the present embodiment. The electrical power supply system 10 is equipped with a first electrical power supply circuit 12a and a second electrical power supply circuit 12b. The first electrical power supply circuit 12a supplies a DC electrical power output from an electrical power generating device 14 to a first load device 16a. The second electrical power supply circuit 12b supplies a DC electrical power output from the electrical power generating device 14 to a second load device 16b. The first electrical power supply circuit 12a and the second electrical power supply circuit 12b may include constituent elements such as switches, sensors, fuses, diodes, resistors, coils, capacitors, and the like.

The electrical power generating device 14 includes an engine, an electrical power generator, and a power control unit, none of which are shown. The electrical power generator is driven by the engine, and generates a three-phase AC electrical power. The power control unit converts the three-phase AC electrical power into a DC electrical power. The electrical power generating device 14 includes a smoothing capacitor 18. At a time when the electrical power supply system 10 is started, charging (precharging) of the smoothing capacitor 18 is carried out. Further, at a time when the electrical power supply system 10 is shut down, discharging of the smoothing capacitor 18 is carried out. The electrical power generating device 14 may include various elements, such as various sensors, fuses, relays, breakers, diodes, transistors, resistors, coils, and the like.

The first load device 16a and the second load device 16b each include an inverter and an electric motor, neither of which is shown. The inverter converts the input DC electrical power into a three-phase AC electrical power. The electric motor is driven by the three-phase AC electrical power. The first load device 16a includes a smoothing capacitor 20a. The second load device 16b includes a smoothing capacitor 20b. At a time when the electrical power supply system 10 is started, first, charging (precharging) of the smoothing capacitor 20a and the smoothing capacitor 20b is carried out. Further, at a time when the electrical power supply system 10 is shut down, discharging of the smoothing capacitor 20a and the smoothing capacitor 20b is carried out. The first load device 16a and the second load device 16b may include various elements such as various sensors, fuses, relays, breakers, diodes, transistors, resistors, coils, capacitors, and the like.

The electrical power supply system 10 is equipped with a third electrical power supply circuit 22a and a fourth electrical power supply circuit 22b. The third electrical power supply circuit 22a supplies a DC electrical power output from a first electrical power storage device 24a to the first load device 16a. The fourth electrical power supply circuit 22b supplies a DC electrical power output from a second electrical power storage device 24b to the second load device 16b. The third electrical power supply circuit 22a and the fourth electrical power supply circuit 22b may include constituent elements such as switches, sensors, fuses, diodes, resistors, coils, capacitors, and the like.

The first electrical power storage device 24a is connected in parallel with the electrical power generating device 14. The second electrical power storage device 24b is connected in parallel with the electrical power generating device 14. The first electrical power storage device 24a and the second electrical power storage device 24b each include, for example, a lithium ion battery. The first electrical power storage device 24a and the second electrical power storage device 24b may each include a secondary battery other than a lithium ion battery. The first electrical power storage device 24a and the second electrical power storage device 24b may each include a large-capacity capacitor.

Figure 2:
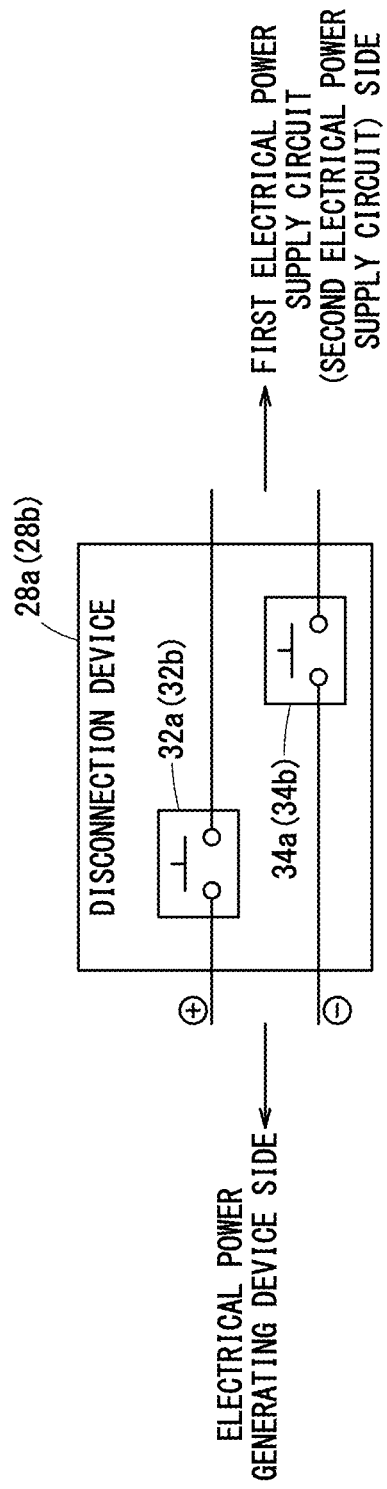
FIG. 2 is a schematic diagram of a disconnection device of the present embodiment.

The electrical power supply system 10 includes a disconnection device 28a and a disconnection device 28b. FIG. 2 is a schematic diagram of the disconnection device 28a and the disconnection device 28b of the present embodiment.

The disconnection device 28a is equipped with a switching unit 32a and a switching unit 34a. The switching unit 32a is provided in a positive electrode wire that connects the electrical power generating device 14 and the first electrical power supply circuit 12a. The switching unit 34a is provided in a negative electrode wire that connects the electrical power generating device 14 and the first electrical power supply circuit 12a. The switching unit 32a and the switching unit 34a, for example, are switches, relays, contactors, breakers, semiconductor switches, or the like.

In the case that both of the switching units 32a and 34a are in the connected state (ON), the disconnection device 28a connects the electrical power generating device 14 to the first electrical power supply circuit 12a. In the case that both of the switching units 32a and 34a are in the disconnected state (OFF), the disconnection device 28a disconnects the electrical power generating device 14 from the first electrical power supply circuit 12a. Moreover, one of the switching units 32a and 34a may be turned OFF, and the disconnection device 28a may disconnect the electrical power generating device 14 from the first electrical power supply circuit 12a.

Hereinafter, in the case that both of the switching units 32a and 34a are in the connected state (ON), it may be stated that the disconnection device 28a is in the connected state (ON). Further, in the case that both of the switching units 32a and 34a are in the disconnected state (OFF), it may be stated that the disconnection device 28a is in the disconnected state (OFF).

The disconnection device 28b is equipped with a switching unit 32b and a switching unit 34b. The switching unit 32b is provided in a positive electrode wire that connects the electrical power generating device 14 and the second electrical power supply circuit 12b. The switching unit 34b is provided in a negative electrode wire that connects the electrical power generating device 14 and the second electrical power supply circuit 12b. The switching unit 32b and the switching unit 34b, for example, are switches, relays, contactors, breakers, semiconductor switches, or the like.

In the case that both of the switching units 32b and 34b are in the connected state (ON), the disconnection device 28b connects the electrical power generating device 14 to the second electrical power supply circuit 12b. In the case that both of the switching units 32b and 34b are in the disconnected state (OFF), the disconnection device 28b disconnects the electrical power generating device 14 from the second electrical power supply circuit 12b. Moreover, one of the switching units 32b and 34b may be turned OFF, and the disconnection device 28b may disconnect the electrical power generating device 14 from the second electrical power supply circuit 12b.

Hereinafter, in the case that both of the switching units 32b and 34b are in the connected state (ON), it may be stated that the disconnection device 28b is in the connected state (ON). Further, in the case that both of the switching units 32b and 34b are in the disconnected state (OFF), it may be stated that the disconnection device 28b is in the disconnected state (OFF).

Figure 3:
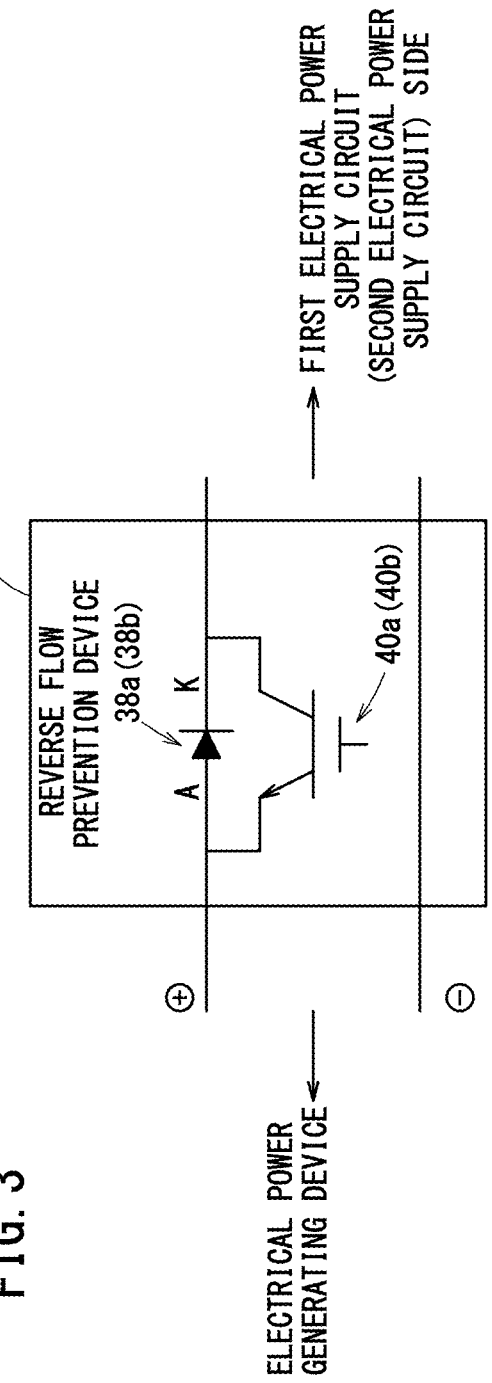
FIG. 3 is a schematic diagram of reverse flow prevention devices.

The electrical power supply system 10 is equipped with a reverse flow prevention device 36a and a reverse flow prevention device 36b. FIG. 3 is a schematic diagram of the reverse flow prevention device 36a and the reverse flow prevention device 36b.

The reverse flow prevention device 36a includes a diode 38a and a transistor 40a. The diode 38a is provided in the positive electrode wire that connects the electrical power generating device 14 and the first electrical power supply circuit 12a. The transistor 40a is disposed in parallel with the diode 38a. Moreover, the diode 38a may be provided in the negative electrode wire that connects the electrical power generating device 14 and the first electrical power supply circuit 12a.

In the case that a value (hereinafter referred to as a potential difference) obtained by subtracting a potential of the diode 38a on the first electrical power supply circuit 12a side (the cathode side) from a potential of the diode 38a on the electrical power generating device 14 side (the anode side) is less than a forward voltage, almost no electrical current flows through the diode 38a. In the case that the potential difference is greater than or equal to the forward voltage, an electrical current flows (is conducted) through the diode 38a. The forward voltage is comparatively low. Therefore, in the following, a description is given assuming that an electrical current flows through the diode 38a in the case that the potential of the anode is higher than the potential of the cathode. Further, a description is given assuming that an electrical current does not flow through the diode 38a in the case that the potential of the anode is lower than the potential of the cathode.

In the case that the transistor 40a is in the disconnected state (OFF), then at a time when the terminal voltage of the electrical power generating device 14 is higher than the terminal voltage of the first load device 16a, the electrical power generating device 14 is connected to the first electrical power supply circuit 12a by the diode 38a. In the case that the transistor 40a is in the disconnected state (OFF), then at a time when the terminal voltage of the electrical power generating device 14 is lower than or equal to the terminal voltage of the first load device 16a, the electrical power generating device 14 is disconnected from the first electrical power supply circuit 12a by the diode 38a.

In the case that the transistor 40a is in the connected state (ON), then regardless of the relationship between the terminal voltage of the electrical power generating device 14 and the terminal voltage of the first load device 16a, the electrical power generating device 14 is connected to the first electrical power supply circuit 12a.

Hereinafter, in the case that the transistor 40a is in the connected state (ON), it may be stated that the reverse flow prevention device 36a is in a state of permitting the reverse flow. Further, in the case that the transistor 40a is in the disconnected state (OFF), it may be stated that the reverse flow prevention device 36a is in a state of prohibiting the reverse flow. Instead of the transistor 40a, for example, a relay, a contactor, a breaker, or the like may be used.

The reverse flow prevention device 36b includes a diode 38b and a transistor 40b. The diode 38b is provided in the positive electrode wire that connects the electrical power generating device 14 and the second electrical power supply circuit 12b. The transistor 40b is disposed in parallel with the diode 38b. Moreover, the diode 38b may be provided in the negative electrode wire that connects the electrical power generating device 14 and the second electrical power supply circuit 12b.

In the case that a value (hereinafter referred to as a potential difference) obtained by subtracting a potential of the diode 38b on the second electrical power supply circuit 12b side (the cathode side) from a potential of the diode 38b on the electrical power generating device 14 side (the anode side) is less than a forward voltage, almost no electrical current flows through the diode 38b. In the case that the potential difference is greater than or equal to the forward voltage, an electrical current flows (is conducted) through the diode 38b. The forward voltage is comparatively low. Therefore, in the following, a description is given assuming that an electrical current flows through the diode 38b in the case that the potential of the anode is higher than the potential of the cathode. Further, in the following, a description is given assuming that an electrical current does not flow through the diode 38b in the case that the potential of the anode is lower than the potential of the cathode.

In the case that the transistor 40b is in the disconnected state (OFF), then at a time when the terminal voltage of the electrical power generating device 14 is higher than the terminal voltage of the second load device 16b, the electrical power generating device 14 is connected to the second electrical power supply circuit 12b by the diode 38b. In the case that the transistor 40b is in the disconnected state (OFF), then at a time when the terminal voltage of the electrical power generating device 14 is lower than or equal to the terminal voltage of the second load device 16b, the electrical power generating device 14 is disconnected from the second electrical power supply circuit 12b by the diode 38b.

In the case that the transistor 40b is in the connected state (ON), then regardless of the relationship between the terminal voltage of the electrical power generating device 14 and the terminal voltage of the second load device 16b, the electrical power generating device 14 is connected to the second electrical power supply circuit 12b.

Hereinafter, in the case that the transistor 40b is in the connected state (ON), it may be stated that the reverse flow prevention device 36b is in the state of permitting the reverse flow. Further, in the case that the transistor 40b is in the disconnected state (OFF), it may be stated that the reverse flow prevention device 36b is in the state of prohibiting the reverse flow. Instead of the transistor 40b, for example, a relay, a contactor, a breaker, or the like may be used.

A first switching device 42a is constituted by the disconnection device 28a and the reverse flow prevention device 36a. The first switching device 42a may have a configuration other than being constituted by the disconnection device 28a and the reverse flow prevention device 36a.

In the case that the disconnection device 28a is set in the connected state (ON), and the reverse flow prevention device 36a is set in the state of permitting the reverse flow, the first switching device 42a electrically connects the electrical power generating device 14 and the first load device 16a.

In the case that the disconnection device 28a is set in the connected state (ON), and the reverse flow prevention device 36a is set in the state of prohibiting the reverse flow, then at a time when the terminal voltage of the electrical power generating device 14 is higher than the terminal voltage of the first load device 16a, the first switching device 42a electrically connects the electrical power generating device 14 and the first load device 16a.

In the case that the disconnection device 28a is set in the connected state (ON), and the reverse flow prevention device 36a is set in the state of prohibiting the reverse flow, then at a time when the terminal voltage of the electrical power generating device 14 is lower than or equal to the terminal voltage of the first load device 16a, the first switching device 42a electrically disconnects the electrical power generating device 14 and the first load device 16a.

In the case that the disconnection device 28a is set in the disconnected state (OFF), then regardless of the state of the reverse flow prevention device 36a, the first switching device 42a electrically disconnects the electrical power generating device 14 and the first load device 16a.

Moreover, in the case that the first electrical power storage device 24a is connected to the third electrical power supply circuit 22a, then at a time when the electrical power generating device 14 and the first load device 16a are electrically connected, the electrical power generating device 14 and the first electrical power storage device 24a are also electrically connected. Further, even in the case that the first electrical power storage device 24a is connected to the third electrical power supply circuit 22a, at a time when the electrical power generating device 14 and the first load device 16a are electrically disconnected, the electrical power generating device 14 and the first electrical power storage device 24a are also electrically disconnected.

Hereinafter, the state, in which the first switching device 42a electrically connects the electrical power generating device 14 and the first load device 16a and also electrically connects the electrical power generating device 14 and the first electrical power storage device 24a, may be referred to as a first state. Further, the state, in which the first switching device 42a electrically disconnects the electrical power generating device 14 and the first load device 16a and also electrically disconnects the electrical power generating device 14 and the first electrical power storage device 24a, may be referred to as a second state.

A second switching device 42b is constituted by the disconnection device 28b and the reverse flow prevention device 36b. The second switching device 42b may have a configuration other than being constituted by the disconnection device 28b and the reverse flow prevention device 36b.

In the case that the disconnection device 28b is set in the connected state (ON), and the reverse flow prevention device 36b is set in the state of permitting the reverse flow, the second switching device 42b electrically connects the electrical power generating device 14 and the second load device 16b.

In the case that the disconnection device 28b is set in the connected state (ON), and the reverse flow prevention device 36b is set in the state of prohibiting the reverse flow, then at a time when the terminal voltage of the electrical power generating device 14 is higher than the terminal voltage of the second load device 16b, the second switching device 42b electrically connects the electrical power generating device 14 and the second load device 16b.

In the case that the disconnection device 28b is set in the connected state (ON), and the reverse flow prevention device 36b is set in the state of prohibiting the reverse flow, then at a time when the terminal voltage of the electrical power generating device 14 is lower than or equal to the terminal voltage of the second load device 16b, the second switching device 42b electrically disconnects the electrical power generating device 14 and the second load device 16b.

In the case that the disconnection device 28b is set in the disconnected state (OFF), then regardless of the state of the reverse flow prevention device 36b, the second switching device 42b electrically disconnects the electrical power generating device 14 and the second load device 16b.

Moreover, in the case that the second electrical power storage device 24b is connected to the fourth electrical power supply circuit 22b, then at a time when the electrical power generating device 14 and the second load device 16b are electrically connected, the electrical power generating device 14 and the second electrical power storage device 24b are also electrically connected. Further, even in the case that the second electrical power storage device 24b is connected to the fourth electrical power supply circuit 22b, at a time when the electrical power generating device 14 and the second load device 16b are electrically disconnected, the electrical power generating device 14 and the second electrical power storage device 24b are also electrically disconnected.

Hereinafter, the state, in which the second switching device 42b electrically connects the electrical power generating device 14 and the second load device 16b and also electrically connects the electrical power generating device 14 and the second electrical power storage device 24b, may be referred to as a third state. Further, the state, in which the second switching device 42b electrically disconnects the electrical power generating device 14 and the second load device 16b and also electrically disconnects the electrical power generating device 14 and the second electrical power storage device 24b, may be referred to as a fourth state.

The electrical power supply system 10 is equipped with a third switching device 44a. The third switching device 44a includes a switching unit 46a, a switching unit 48a, a switching unit 50a, and a precharging resistor 52a. The switching unit 46a is provided in a positive electrode wire that connects the first electrical power storage device 24a and the third electrical power supply circuit 22a. The switching unit 48a is provided in a negative electrode wire that connects the first electrical power storage device 24a and the third electrical power supply circuit 22a. The switching unit 50a is disposed in a precharging circuit 54a that bypasses the switching unit 46a. The precharging resistor 52a, which is connected in series with the switching unit 50a, is disposed in the precharging circuit 54a. The switching unit 46a, the switching unit 48a, and the switching unit 50a, for example, are switches, relays, contactors, breakers, semiconductor switches, or the like.

In the case that the switching unit 46a is in the connected state (ON), the switching unit 48a is in the connected state (ON), and the switching unit 50a is in the disconnected state (OFF), the third switching device 44a connects the first electrical power storage device 24a, but not via the precharging resistor 52a, to the third electrical power supply circuit 22a.

In the case that the switching unit 46a is in the disconnected state (OFF), the switching unit 48a is in the connected state (ON), and the switching unit 50a is in the connected state (ON), the third switching device 44a connects the first electrical power storage device 24a via the precharging resistor 52a to the third electrical power supply circuit 22a.

In the case that the switching unit 46a is in the disconnected state (OFF), the switching unit 48a is in the disconnected state (OFF), and the switching unit 50a is in the disconnected state (OFF), the third switching device 44a disconnects the first electrical power storage device 24a from the third electrical power supply circuit 22a. Moreover, by setting the switching unit 46a in the connected state (ON), the switching unit 48a in the disconnected state (OFF), and the switching unit 50a in the connected state (ON), the third switching device 44a may also disconnect the first electrical power storage device 24a from the third electrical power supply circuit 22a. Further, by setting the switching unit 46a in the disconnected state (OFF), the switching unit 48a in the disconnected state (OFF), and the switching unit 50a in the connected state (ON), the third switching device 44a may also disconnect the first electrical power storage device 24a from the third electrical power supply circuit 22a. Furthermore, by setting the switching unit 46a in the connected state (ON), the switching unit 48a in the disconnected state (OFF), and the switching unit 50a in the disconnected state (OFF), the third switching device 44a may also disconnect the first electrical power storage device 24a from the third electrical power supply circuit 22a. Still further, by setting the switching unit 46a in the disconnected state (OFF), the switching unit 48a in the connected state (ON), and the switching unit 50a in the disconnected state (OFF), the third switching device 44a may also disconnect the first electrical power storage device 24a from the third electrical power supply circuit 22a.

The electrical power supply system 10 is equipped with a fourth switching device 44b. The fourth switching device 44b includes a switching unit 46b, a switching unit 48b, a switching unit 50b, and a precharging resistor 52b. The switching unit 46b is provided in a positive electrode wire that connects the second electrical power storage device 24b and the fourth electrical power supply circuit 22b. The switching unit 48b is provided in a negative electrode wire that connects the second electrical power storage device 24b and the fourth electrical power supply circuit 22b. The switching unit 50b is disposed in a precharging circuit 54b that bypasses the switching unit 46b. The precharging resistor 52b, which is connected in series with the switching unit 50b, is disposed in the precharging circuit 54b. The switching unit 46b, the switching unit 48b, and the switching unit 50b, for example, are switches, relays, contactors, breakers, semiconductor switches, or the like.

In the case that the switching unit 46b is in the connected state (ON), the switching unit 48b is in the connected state (ON), and the switching unit 50b is in the disconnected state (OFF), the fourth switching device 44b connects the second electrical power storage device 24b, but not via the precharging resistor 52b, to the fourth electrical power supply circuit 22b.

In the case that the switching unit 46b is in the disconnected state (OFF), the switching unit 48b is in the connected state (ON), and the switching unit 50b is in the connected state (ON), the fourth switching device 44b connects the second electrical power storage device 24b via the precharging resistor 52b to the fourth electrical power supply circuit 22b.

In the case that the switching unit 46b is in the disconnected state (OFF), the switching unit 48b is in the disconnected state (OFF), and the switching unit 50b is in the disconnected state (OFF), the fourth switching device 44b disconnects the second electrical power storage device 24b from the fourth electrical power supply circuit 22b. Moreover, by setting the switching unit 46b in the connected state (ON), the switching unit 48b in the disconnected state (OFF), and the switching unit 50b in the connected state (ON), the fourth switching device 44b may also disconnect the second electrical power storage device 24b from the fourth electrical power supply circuit 22b. Further, by setting the switching unit 46b in the disconnected state (OFF), the switching unit 48b in the disconnected state (OFF), and the switching unit 50b in the connected state (ON), the fourth switching device 44b may also disconnect the second electrical power storage device 24b from the fourth electrical power supply circuit 22b. Further, by setting the switching unit 46b in the connected state (ON), the switching unit 48b in the disconnected state (OFF), and the switching unit 50b in the disconnected state (OFF), the fourth switching device 44b may also disconnect the second electrical power storage device 24b from the fourth electrical power supply circuit 22b. Still further, by setting the switching unit 46b in the disconnected state (OFF), the switching unit 48b in the connected state (ON), and the switching unit 50b in the disconnected state (OFF), the fourth switching device 44b may also disconnect the second electrical power storage device 24b from the fourth electrical power supply circuit 22b.

The electrical power supply system 10 is equipped with a voltage sensor 56a and a voltage sensor 56b. The voltage sensor 56a detects the terminal voltage (the output voltage) of the first electrical power storage device 24a. The voltage sensor 56b detects the terminal voltage (the output voltage) of the second electrical power storage device 24b. Hereinafter, the terminal voltage of the first electrical power storage device 24a may be referred to as a first voltage. Further, the terminal voltage of the second electrical power storage device 24b may be referred to as a second voltage.

[Configuration of Control Device]

Figure 4:
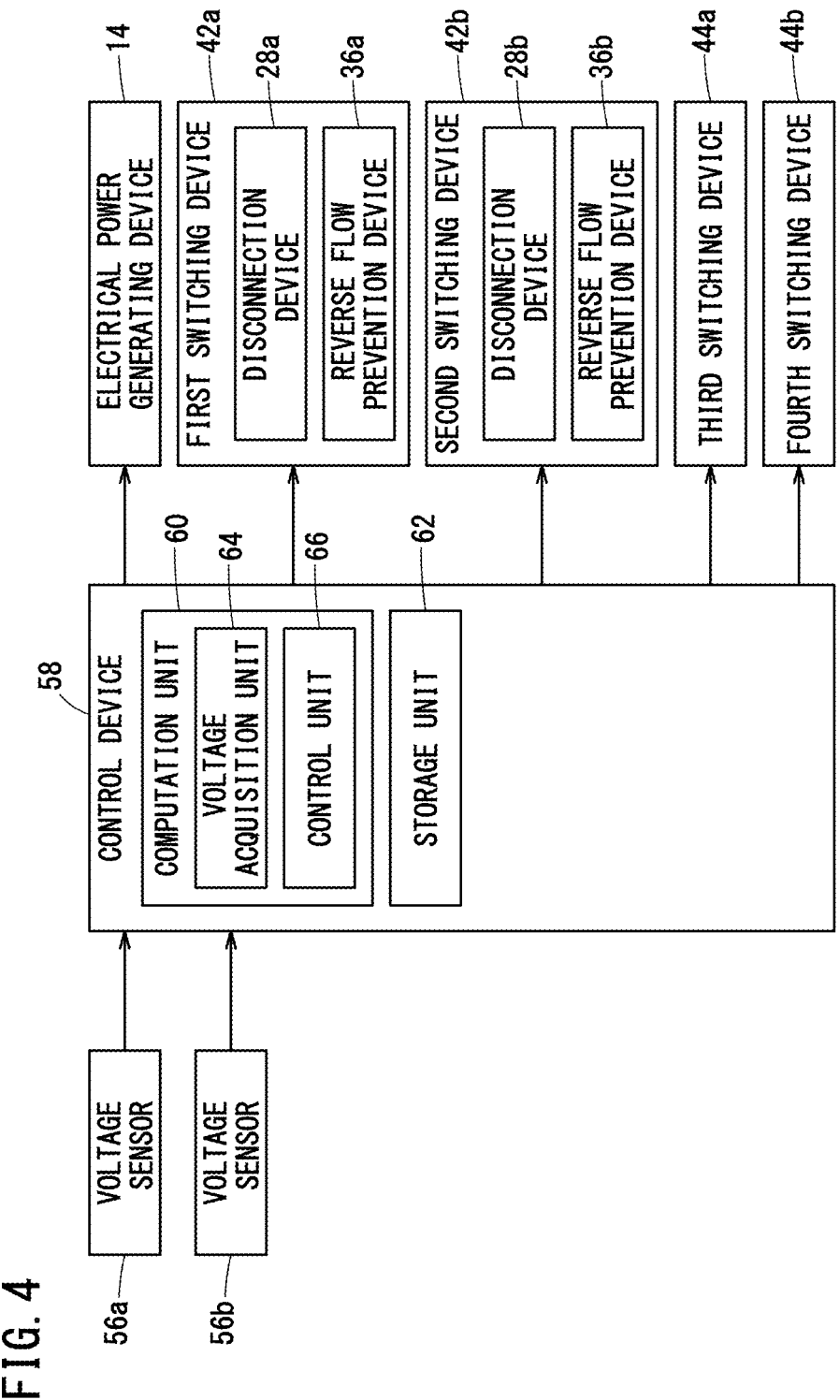
FIG. 4 is a control block diagram of a control device in the present embodiment.

The electrical power supply system 10 is equipped with a control device 58. FIG. 4 is a control block diagram of the control device 58 in the present embodiment.

The control device 58 includes a computation unit 60 and a storage unit 62. The computation unit 60 includes a processor such as a CPU (Central Processing Unit) or a GPU (Graphics Processing Unit) or the like. The computation unit 60 controls each of respective devices by executing a program that is stored in the storage unit 62. At least a portion of the computation unit 60 may be realized by an integrated circuit such as an ASIC (Application Specific Integrated Circuit) or an FPGA (Field-Programmable Gate Array) or the like. At least a portion of the computation unit 60 may be realized by an electronic circuit including a discrete device.

The computation unit 60 functions as a voltage acquisition unit 64 and a control unit 66. The voltage acquisition unit 64 acquires, from the voltage sensor 56a, the terminal voltage (the output voltage) of the first electrical power storage device 24a. The voltage acquisition unit 64 acquires, from the voltage sensor 56b, the terminal voltage (the output voltage) of the second electrical power storage device 24b. The control unit 66 controls each of the electrical power generating device 14, the first switching device 42a, the second switching device 42b, the third switching device 44a, and the fourth switching device 44b.

The storage unit 62 is constituted by a non-illustrated volatile memory and a non-illustrated non-volatile memory, which are computer readable non-transitory storage media. The volatile memory, for example, is a RAM (Random Access Memory) or the like. The non-volatile memory, for example, is a ROM (Read Only Memory), a flash memory, or the like. Data and the like are stored, for example, in the volatile memory. A program, a table, a map and the like are stored, for example, in the non-volatile memory. At least a portion of the storage unit 62 may be provided in the processor, the integrated circuit, or the like described above.

[Operation of Electrical Power Supply System]

The first load device 16a and the second load device 16b are driven by the electrical power supplied from the electrical power generating device 14. In the case that the generated electrical power of the electrical power generating device 14 is insufficient with respect to the electrical power required by the first load device 16a, electrical power is supplied from the first electrical power storage device 24a to the first load device 16a. Similarly, in the case that the generated electrical power of the electrical power generating device 14 is insufficient with respect to the electrical power required by the second load device 16b, electrical power is supplied from the second electrical power storage device 24b to the second load device 16b.

While the first load device 16a and the second load device 16b are being driven, a difference may occur between the amount of electrical power of the first electrical power storage device 24a consumed by the first load device 16a, and the amount of electrical power of the second electrical power storage device 24b consumed by the second load device 16b. In this case, a difference may occur between the remaining capacity of the first electrical power storage device 24a and the remaining capacity of the second electrical power storage device 24b. Therefore, when the electrical power supply system 10 is stopped, a terminal voltage (Vbat1) of the first electrical power storage device 24a and a terminal voltage (Vbat2) of the second electrical power storage device 24b may differ from each other.

Figure 5:
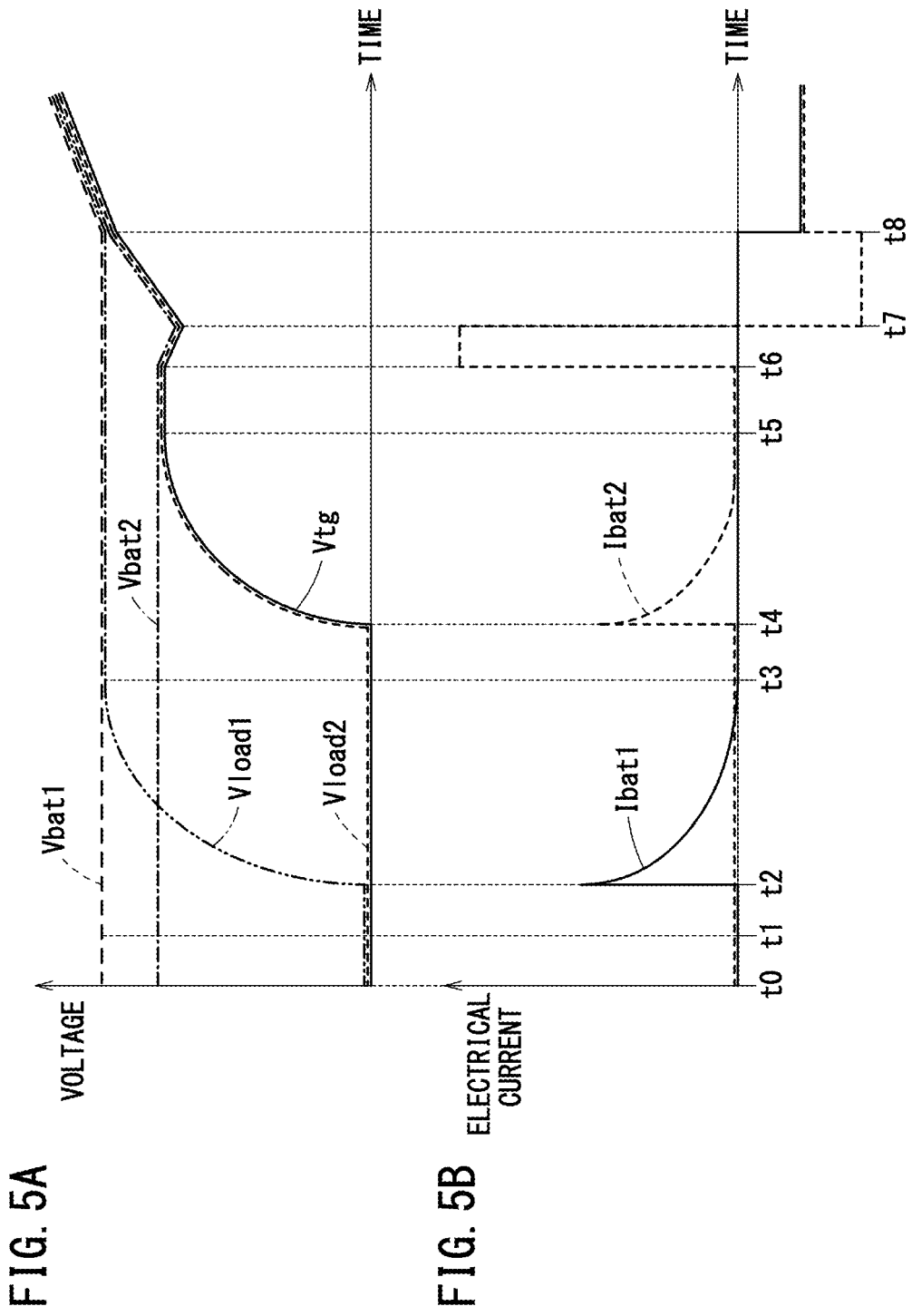
FIG. 5A is a time chart of a voltage in the electrical power supply system at a time of starting in the present embodiment.
FIG. 5B is a time chart of an electrical current in the electrical power supply system at a time of starting in the present embodiment.

FIG. 5A is a time chart of a voltage in the electrical power supply system 10 at a time of starting in the present embodiment. FIG. 5B is a time chart of an electrical current in the electrical power supply system 10 at a time of starting in the present embodiment. FIG. 6 to FIG. 14 are diagrams showing states of the electrical power supply system 10 in the present embodiment.

Hereinafter, using FIG. 5A, FIG. 5B, and FIG. 6 to FIG. 14, a description will be given concerning the operations of the electrical power supply system 10 at a time of starting. At a point in time when the electrical power supply system 10 is started, it is assumed that the terminal voltage (Vbat1) of the first electrical power storage device 24a is higher than the terminal voltage (Vbat2) of the second electrical power storage device 24b.

(Electrical Power Supply System at Time of Stopping)

Figure 6:
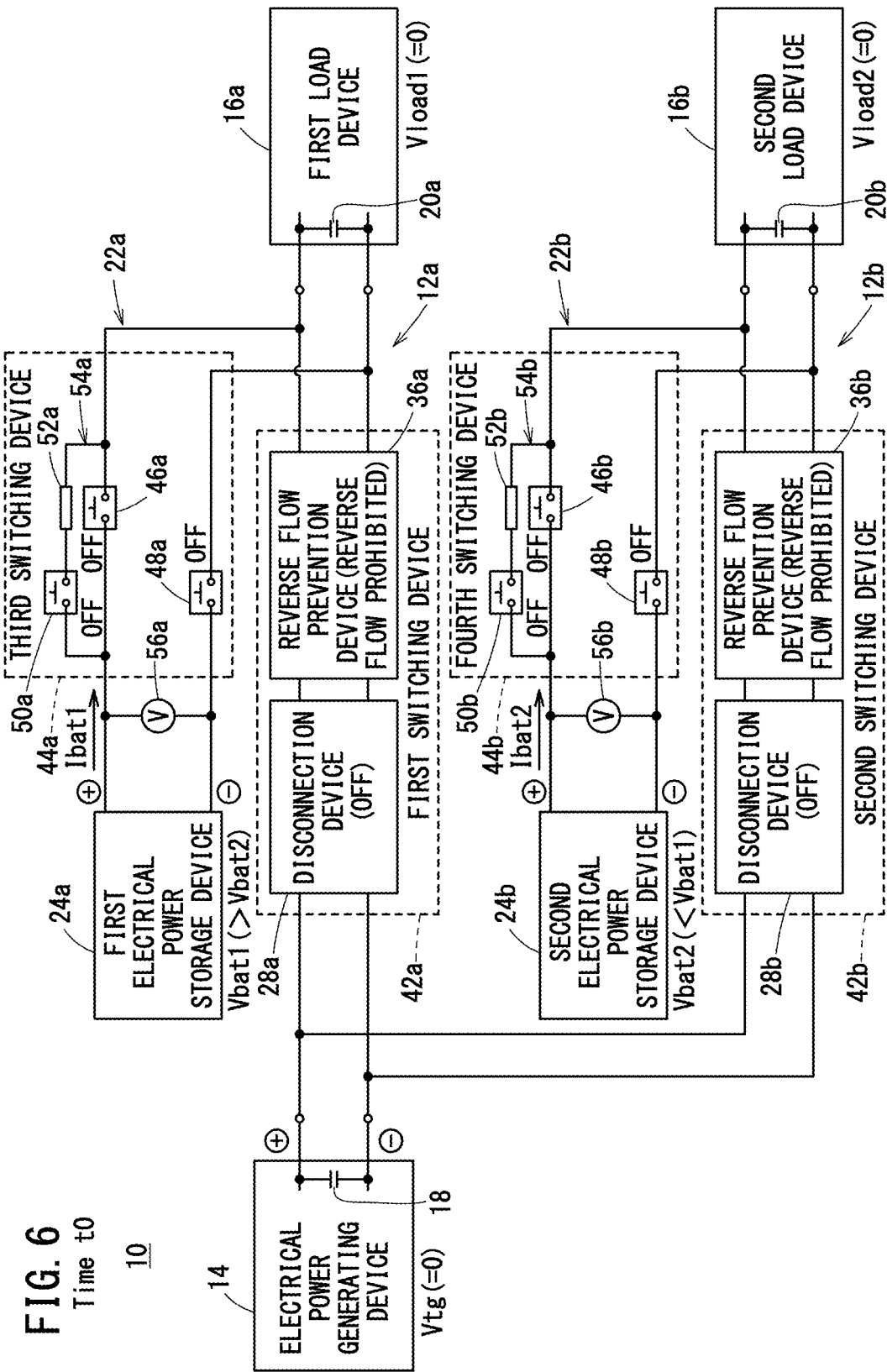
FIG. 6 is a diagram showing a state of the electrical power supply system in the present embodiment.

FIG. 6 is a diagram showing a state of the electrical power supply system 10 at a time of stopping (time to). When the electrical power supply system 10 is made to stop, the control unit 66, together with setting the disconnection device 28a in the disconnected state (OFF), sets the reverse flow prevention device 36a in the state of prohibiting the reverse flow. In accordance with this feature, the electrical power generating device 14 is disconnected from the first electrical power supply circuit 12a. Further, the control unit 66, together with setting the disconnection device 28b in the disconnected state (OFF), sets the reverse flow prevention device 36b in the state of prohibiting the reverse flow. In accordance with this feature, the electrical power generating device 14 is disconnected from the second electrical power supply circuit 12b.

Furthermore, when the electrical power supply system 10 is made to stop, the control unit 66 sets the switching unit 46a in the disconnected state (OFF), sets the switching unit 48a in the disconnected state (OFF), and sets the switching unit 50a in the disconnected state (OFF). In accordance with this feature, the first electrical power storage device 24a is disconnected from the third electrical power supply circuit 22a. Further, the control unit 66 sets the switching unit 46b in the disconnected state (OFF), sets the switching unit 48b in the disconnected state (OFF), and sets the switching unit 50b in the disconnected state (OFF). In accordance with this feature, the second electrical power storage device 24b is disconnected from the fourth electrical power supply circuit 22b.

(Electrical Power Supply System at Time of Starting)

Figure 7:
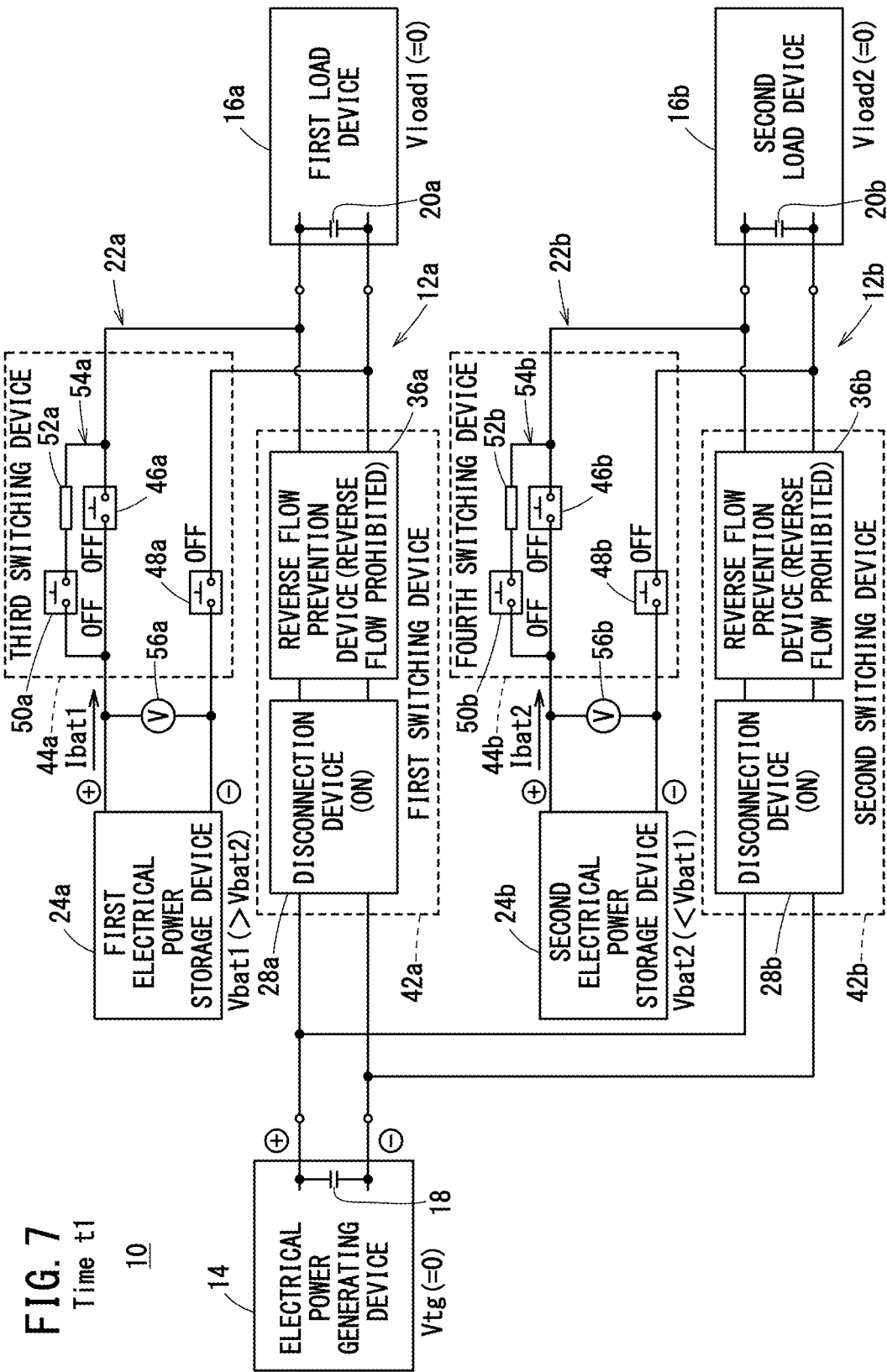
FIG. 7 is a diagram showing a state of the electrical power supply system in the present embodiment.

FIG. 7 is a diagram showing a state of the electrical power supply system 10 at a time of starting (time t1). At a time of starting of the electrical power supply system 10, the control unit 66, together with setting the disconnection device 28a in the connected state (ON), sets the disconnection device 28b in the connected state (ON).

(Electrical Power Supply System at Time of Starting of Charging of Smoothing Capacitor of First Load Device)

Figure 8:
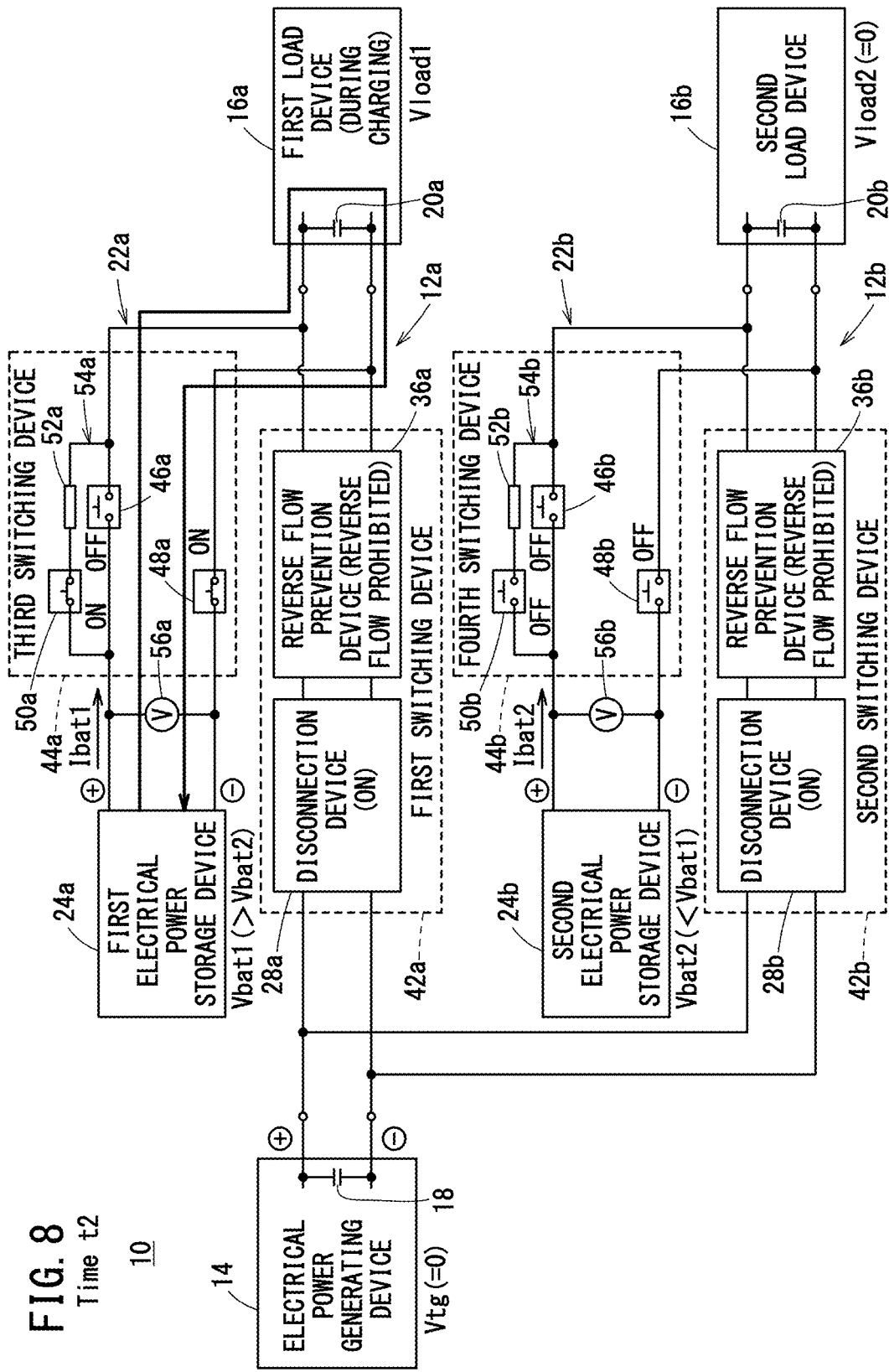
FIG. 8 is a diagram showing a state of the electrical power supply system in the present embodiment.

FIG. 8 is a diagram showing a state of the electrical power supply system 10 at a time of starting of charging of the smoothing capacitor 20a of the first load device 16a (time t2). When the smoothing capacitor 20a is charged, the control unit 66, together with setting the switching unit 48a in the connected state (ON), sets the switching unit 50a in the connected state (ON). In accordance with this feature, the first load device 16a is connected via the precharging resistor 52a to the first electrical power storage device 24a. Therefore, without an excessive electrical current flowing through the electrical power supply system 10, the smoothing capacitor 20a is charged by the electrical power of the first electrical power storage device 24a.

As shown in FIG. 5B, an electrical current (Ibat1) flows from the first electrical power storage device 24a to the first load device 16a. An electrical charge is gradually accumulated in the smoothing capacitor 20a, and as shown in FIG. 5A, a terminal voltage (Vload1) of the first load device 16a gradually rises. At time t3, the terminal voltage (Vload1) of the first load device 16a reaches the same voltage as the terminal voltage (Vbat1) of the first electrical power storage device 24a, and the charging of the smoothing capacitor 20a is completed.

At this time, the reverse flow prevention device 36a is in the state of prohibiting the reverse flow. Therefore, electrical power is not supplied from the first electrical power storage device 24a to the electrical power generating device 14 and the second load device 16b, and the smoothing capacitor 18 of the electrical power generating device 14 and the smoothing capacitor 20b of the second load device 16b are not charged.

(Electrical Power Supply System at Time of Completion of Charging of Smoothing Capacitor of First Load Device)

Figure 9:
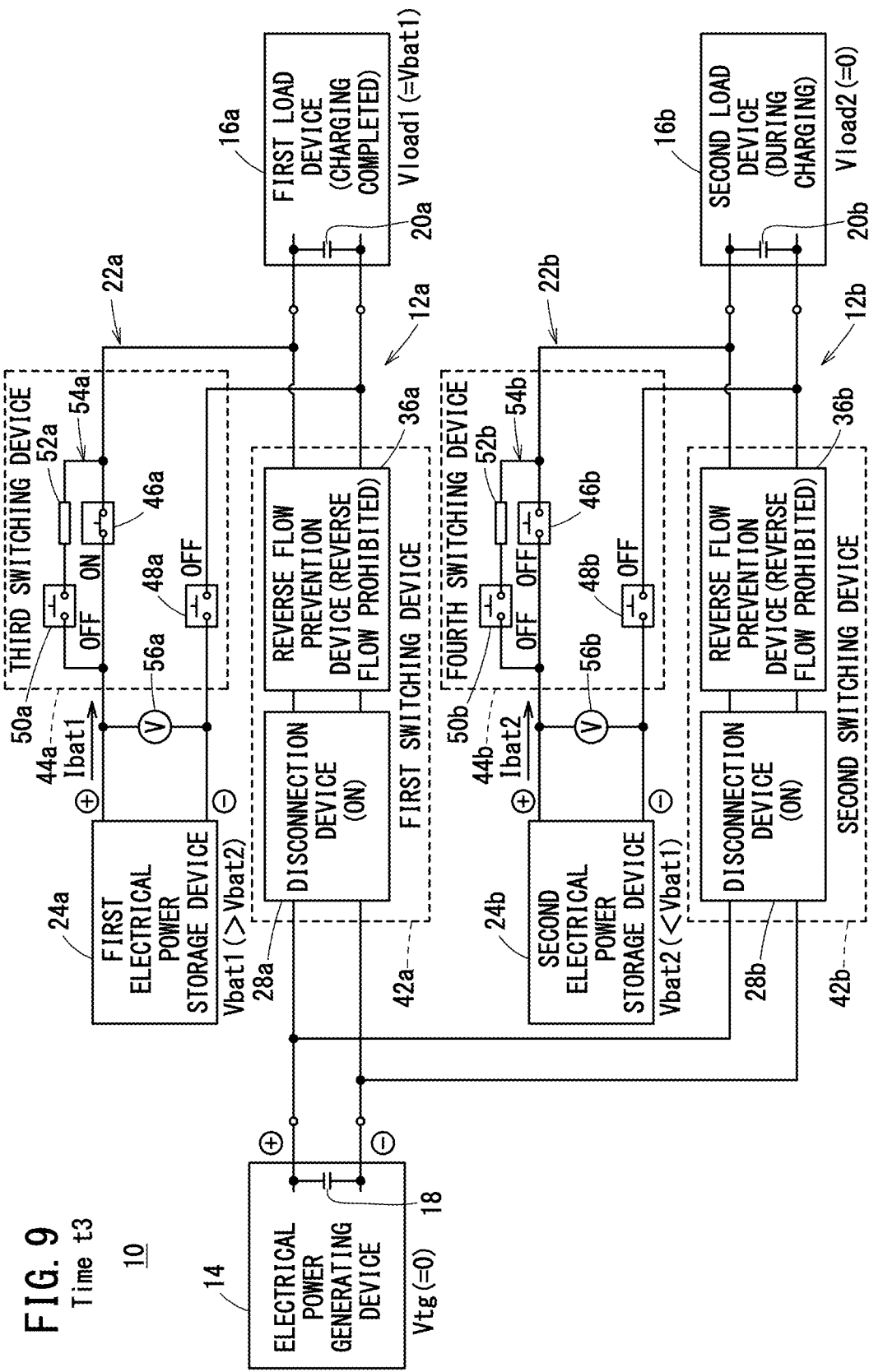
FIG. 9 is a diagram showing a state of the electrical power supply system in the present embodiment.

FIG. 9 is a diagram showing a state of the electrical power supply system 10 at a time of completion of charging of the smoothing capacitor 20a of the first load device 16a (time t3). In the case that the charging of the smoothing capacitor 20a is completed, the control unit 66 sets the switching unit 46a in the connected state (ON). Thereafter, the control unit 66 sets the switching unit 50a in the disconnected state (OFF).

(Electrical Power Supply System at Time of Starting of Charging of Smoothing Capacitor of Electrical Power Generating Device and Smoothing Capacitor of Second Load Device)

Figure 10:
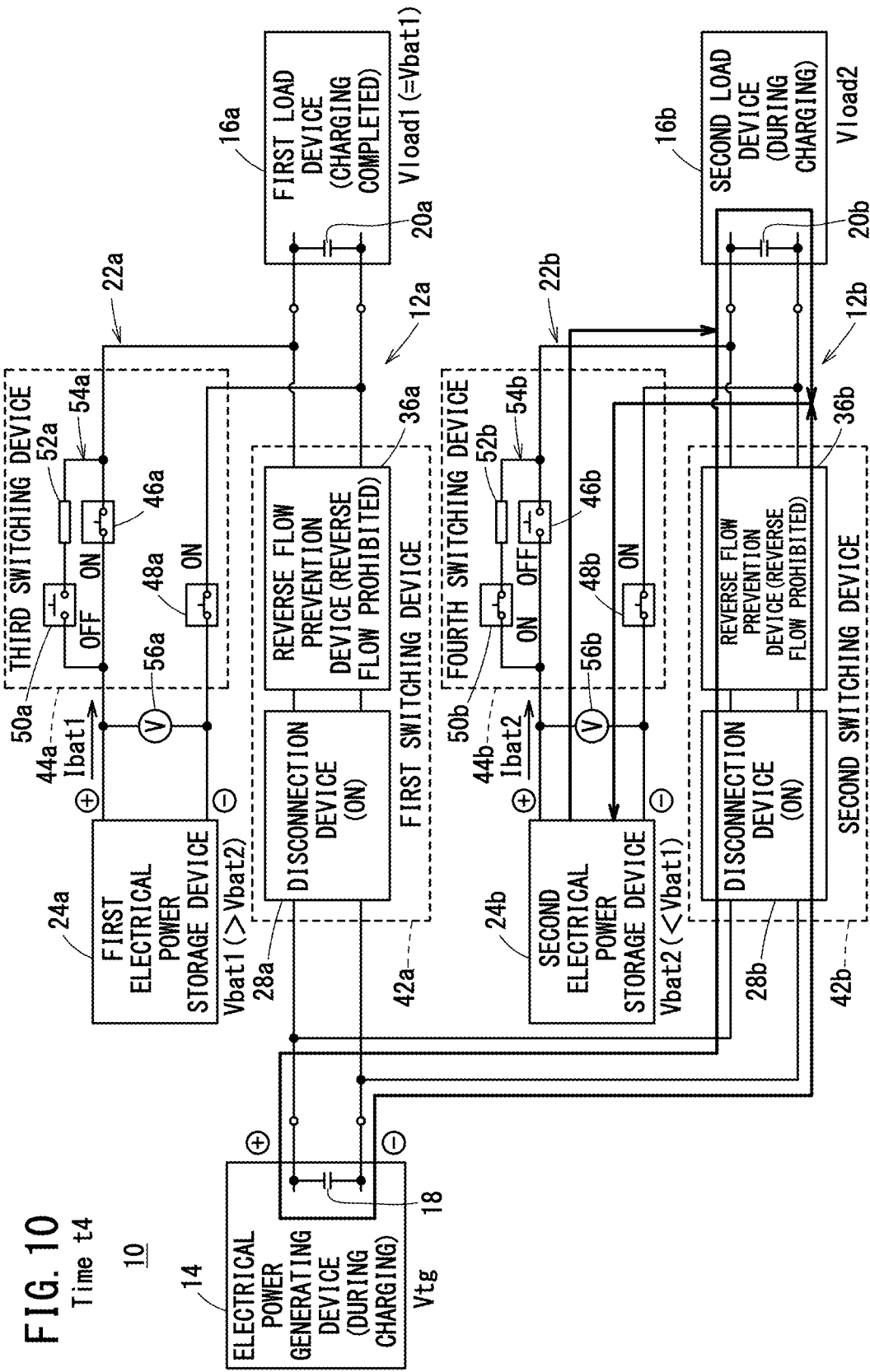
FIG. 10 is a diagram showing a state of the electrical power supply system in the present embodiment.

FIG. 10 is a diagram showing a state of the electrical power supply system 10 at a time of starting of charging of the smoothing capacitor 18 of the electrical power generating device 14 and the smoothing capacitor 20b of the second load device 16b (time t4). When the smoothing capacitor 18 and the smoothing capacitor 20b are charged, the control unit 66 sets the reverse flow prevention device 36b in the state of permitting the reverse flow. Thereafter, the control unit 66, together with setting the switching unit 48b in the connected state (ON), sets the switching unit 50b in the connected state (ON).

In accordance with this feature, the electrical power generating device 14 is connected via the precharging resistor 52b to the second electrical power storage device 24b. Therefore, without an excessive electrical current flowing through the electrical power supply system 10, the smoothing capacitor 18 is charged by the electrical power of the second electrical power storage device 24b. Further, the second load device 16b is connected via the precharging resistor 52b to the second electrical power storage device 24b. Therefore, without an excessive electrical current flowing through the electrical power supply system 10, the smoothing capacitor 20b is charged by the electrical power of the second electrical power storage device 24b.

As shown in FIG. 5B, an electrical current (Ibat2) flows from the second electrical power storage device 24b to the electrical power generating device 14 and the second load device 16b. An electrical charge is gradually accumulated in the smoothing capacitor 18 and the smoothing capacitor 20b, and as shown in FIG. 5A, a terminal voltage (Vtg) of the electrical power generating device 14 and a terminal voltage (Vload2) of the second load device 16b gradually rise. At time t5, the terminal voltage (Vtg) of the electrical power generating device 14 and the terminal voltage (Vload2) of the second load device 16b reach the same voltage as the terminal voltage (Vbat2) of the second electrical power storage device 24b, and charging of the smoothing capacitor 18 and the smoothing capacitor 20b is completed.

At this time, the reverse flow prevention device 36a is in the state of prohibiting the reverse flow. Therefore, the electrical power of the first electrical power storage device 24a is not supplied to the electrical power generating device 14 and the second load device 16b.

(Electrical Power Supply System at Time of Completion of Charging of Smoothing Capacitor of Electrical Power Generating Device and Smoothing Capacitor of Second Load Device)

Figure 11:
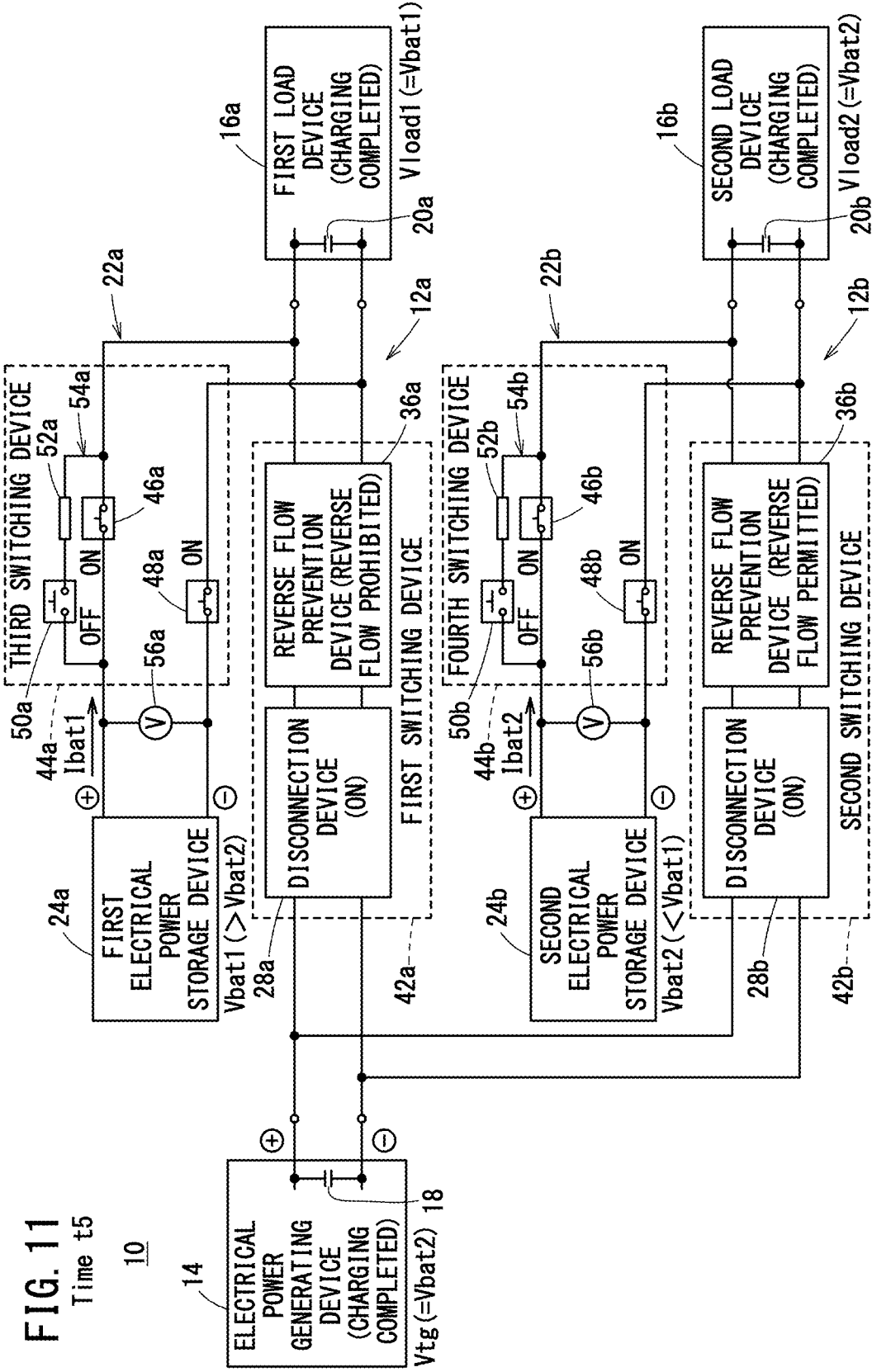
FIG. 11 is a diagram showing a state of the electrical power supply system in the present embodiment.

FIG. 11 is a diagram showing a state of the electrical power supply system 10 at a time of completion of charging of the smoothing capacitor 18 of the electrical power generating device 14 and the smoothing capacitor 20b of the second load device 16b (time t5). In the case that the charging of the smoothing capacitor 18 and the smoothing capacitor 20b is completed, the control unit 66 sets the switching unit 46b in the connected state (ON). Thereafter, the control unit 66 sets the switching unit 50b in the disconnected state (OFF).

At this time, the reverse flow prevention device 36a is in the state of prohibiting the reverse flow. Therefore, the electrical power of the first electrical power storage device 24a is not supplied to the electrical power generating device 14 and the second load device 16b.

(Electrical Power Supply System at Time of Starting of Electrical Power Generating Device)

Figure 12:
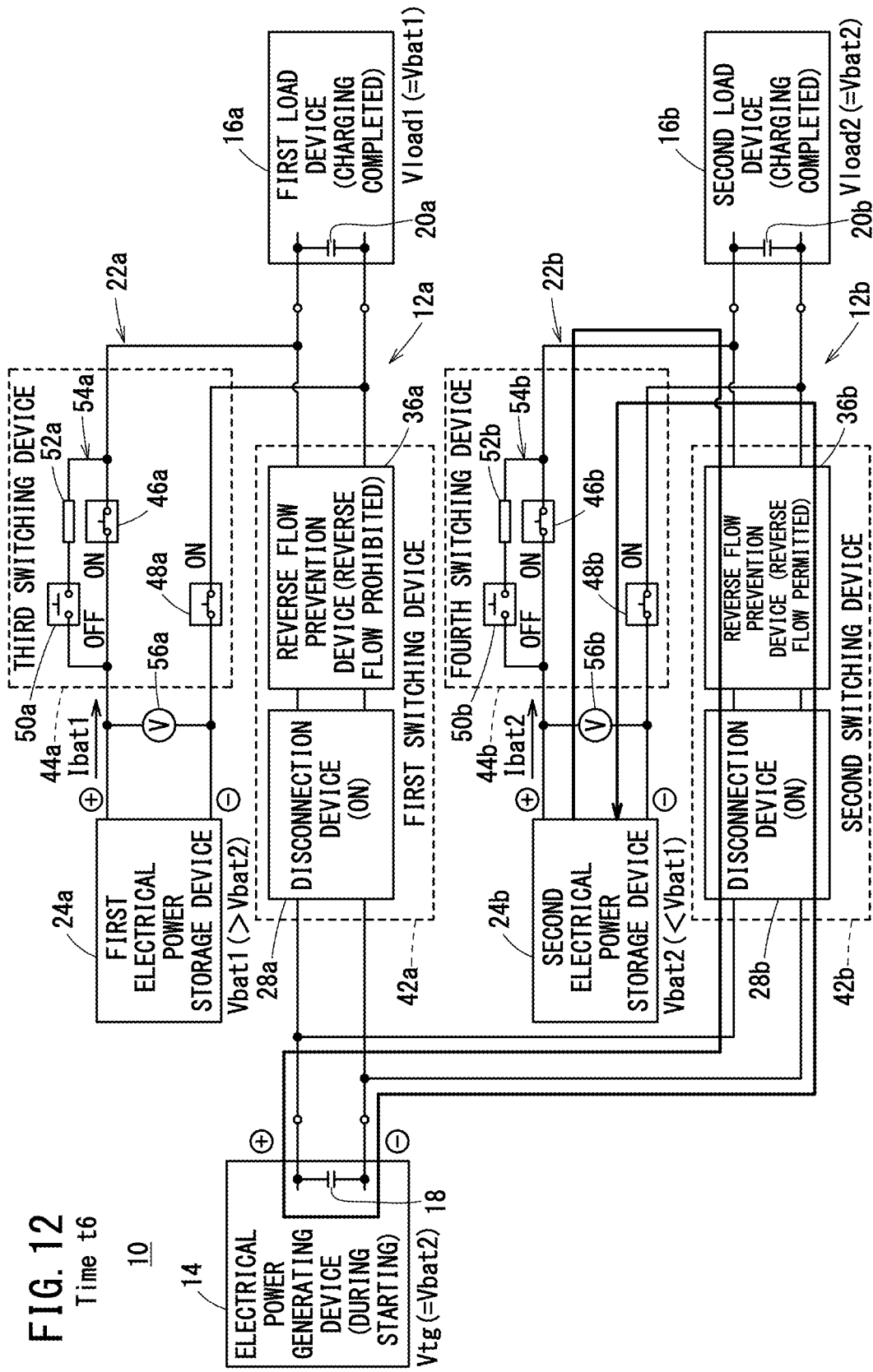
FIG. 12 is a diagram showing a state of the electrical power supply system in the present embodiment.

FIG. 12 is a diagram showing a state of the electrical power supply system 10 at a time of starting of the electrical power generating device 14 (time t6). At the time of starting of the electrical power generating device 14, the control unit 66 causes the electrical power generating device 14 to undergo powered operation by the electrical power of the second electrical power storage device 24b, and after the rotational speed of the rotor of the electrical power generating device 14 has risen to a sufficient rotational speed, ignites the engine of the electrical power generating device 14.

As shown in FIG. 5B, the electrical current (Ibat2) flows from the second electrical power storage device 24b to the electrical power generating device 14. The electrical power of the second electrical power storage device 24b is consumed by the powered operation of the electrical power generating device 14, and the terminal voltage (Vbat2) of the second electrical power storage device 24b decreases. Accompanying the decrease in the terminal voltage (Vbat2) of the second electrical power storage device 24b, the terminal voltage (Vtg) of the electrical power generating device 14 and the terminal voltage (Vload2) of the second load device 16b also decrease.

At this time, the reverse flow prevention device 36a is in the state of prohibiting the reverse flow. Therefore, the electrical power of the first electrical power storage device 24a is not supplied to the electrical power generating device 14 and the second load device 16b.

(Electrical Power Supply System at Time of Starting of Electrical Power Generation of Electrical Power Generating Device)

Figure 13:
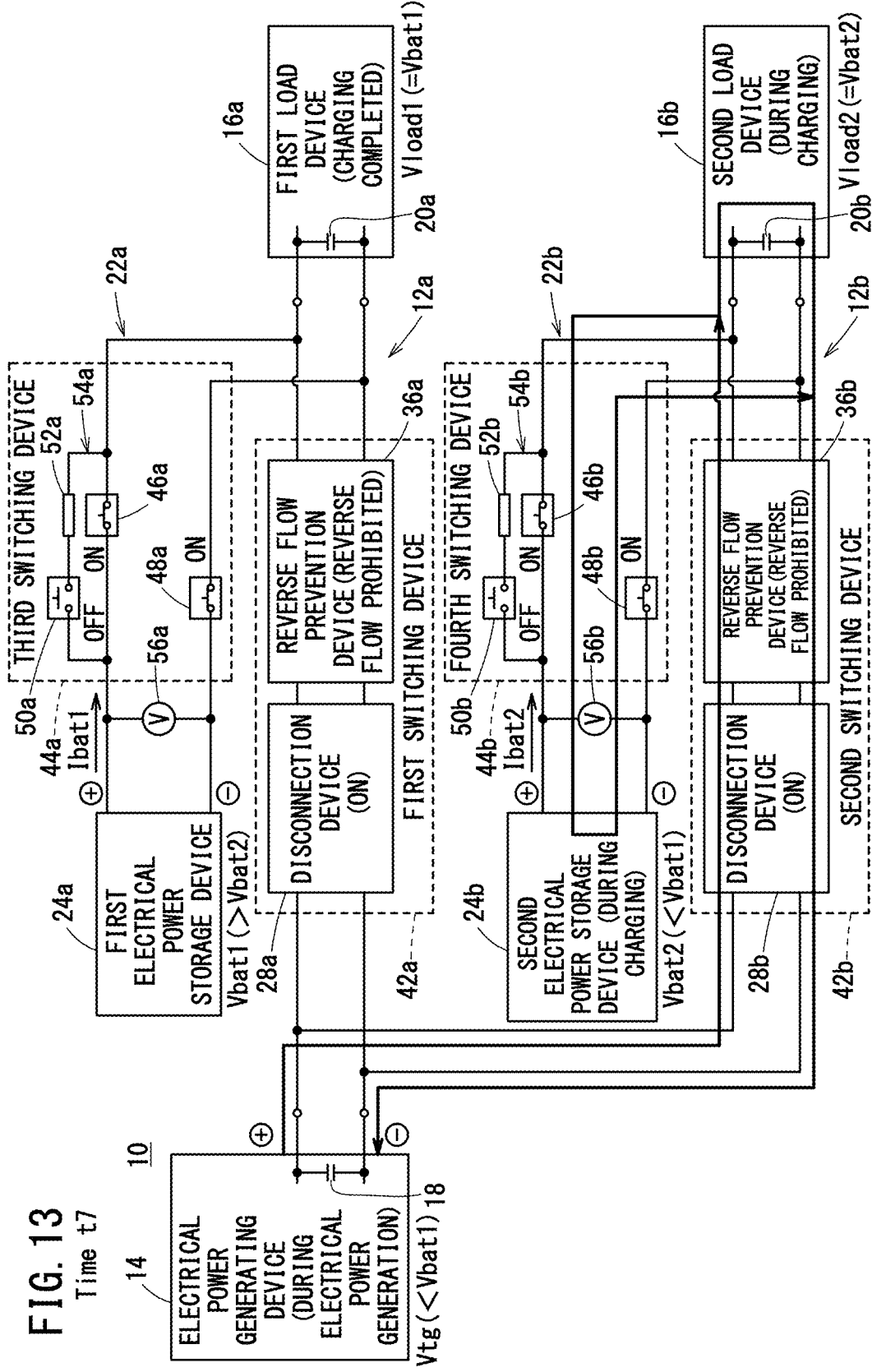
FIG. 13 is a diagram showing a state of the electrical power supply system in the present embodiment.

FIG. 13 is a diagram showing a state of the electrical power supply system 10 at a time of starting of electrical power generation of the electrical power generating device 14 (time t7). In the case that the electrical power generating device 14 undergoes autonomous rotation, and the electrical power generating device 14 starts generating electrical power, the smoothing capacitor 20b of the second load device 16b and the second electrical power storage device 24b are charged by the electrical power of the electrical power generating device 14. After the electrical power generating device 14 has started generating electrical power, the control unit 66 sets the reverse flow prevention device 36b in the state of prohibiting the reverse flow.

As shown in FIG. 5B, the electrical current (Ibat2) flows from the electrical power generating device 14 to the second electrical power storage device 24b. The second electrical power storage device 24b is charged by the electrical power of the electrical power generating device 14, and as shown in FIG. 5A, the terminal voltage (Vbat2) of the second electrical power storage device 24b gradually rises. Accompanying the rising of the terminal voltage (Vbat2) of the second electrical power storage device 24b, the terminal voltage (Vtg) of the electrical power generating device 14 and the terminal voltage (Vload2) of the second load device 16b also rise.

At this time, the reverse flow prevention device 36a is in the state of prohibiting the reverse flow. Therefore, the electrical power of the first electrical power storage device 24a is not supplied to the electrical power generating device 14 and the second load device 16b. Further, the terminal voltage (Vtg) of the electrical power generating device 14 is lower than the terminal voltage (Vbat1) of the first electrical power storage device 24a and the terminal voltage (Vload1) of the first load device 16a. Therefore, electrical power is not supplied from the electrical power generating device 14 to the first electrical power storage device 24a and the first load device 16a.

(Electrical Power Supply System at Time when Terminal Voltage of First Electrical Power Storage Device and Terminal Voltage of Second Electrical Power Storage have Become Equal)

Figure 14:
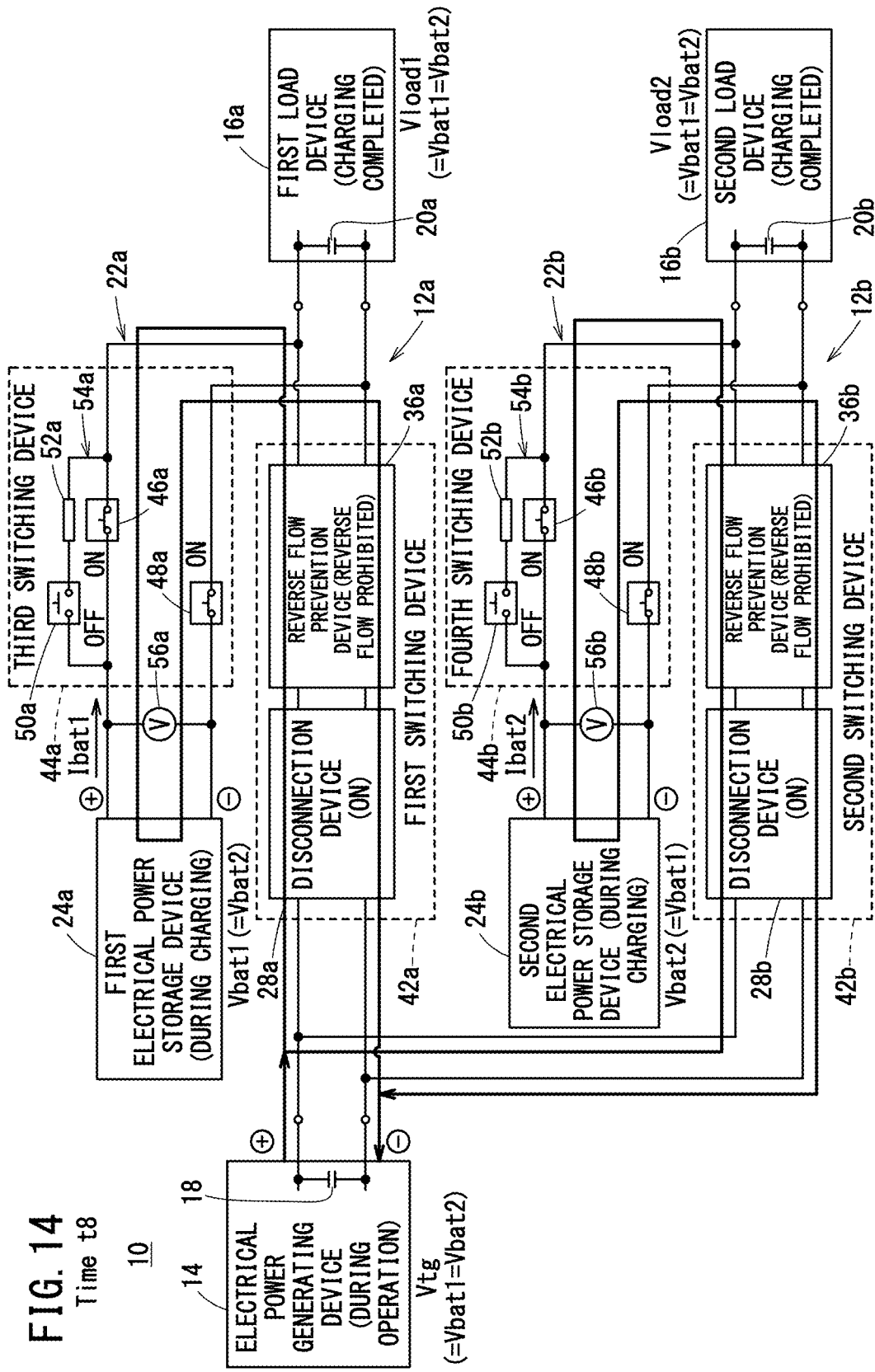
FIG. 14 is a diagram showing a state of the electrical power supply system in the present embodiment.

FIG. 14 is a diagram showing a state of the electrical power supply system 10 at a time when the terminal voltage (Vbat1) of the first electrical power storage device 24a and the terminal voltage (Vbat2) of the second electrical power storage device 24b have become equal (time t8). In the case that the terminal voltage (Vbat1) of the first electrical power storage device 24a and the terminal voltage (Vbat2) of the second electrical power storage device 24b have become equal, the smoothing capacitor 20a of the first load device 16a and the first electrical power storage device 24a are charged by the electrical power of the electrical power generating device 14.

In actuality, in the diode 38a of the reverse flow prevention device 36a in the first switching device 42a, the electrical current flows therethrough in the case that a potential difference between the anode potential and the cathode potential is greater than or equal to the forward voltage. Therefore, in the aforementioned case, the terminal voltage (Vtg) of the electrical power generating device 14 is higher than the terminal voltage (Vbat1) of the first electrical power storage device 24a. More specifically, in the case that the terminal voltage (Vtg) of the electrical power generating device 14 is higher than the terminal voltage (Vbat1) of the first electrical power storage device 24a, the first switching device 42a permits the supply of electrical power from the electrical power generating device 14 to the first electrical power storage device 24a.

Further, in the case that the terminal voltage (Vbat1) of the first electrical power storage device 24a and the terminal voltage (Vbat2) of the second electrical power storage device 24b have become equal, the smoothing capacitor 20b of the second load device 16b and the second electrical power storage device 24b are charged by the electrical power of the electrical power generating device 14.

In actuality, in the diode 38b of the reverse flow prevention device 36b in the second switching device 42b, the electrical current flows therethrough in the case that a potential difference between the anode potential and the cathode potential is greater than or equal to the forward voltage. Therefore, in the aforementioned case, the terminal voltage (Vtg) of the electrical power generating device 14 is higher than the terminal voltage (Vbat2) of the second electrical power storage device 24b. More specifically, in the case that the terminal voltage (Vtg) of the electrical power generating device 14 is higher than the terminal voltage (Vbat2) of the second electrical power storage device 24b, the second switching device 42b permits the supply of electrical power from the electrical power generating device 14 to the second electrical power storage device 24b.

As shown in FIG. 5B, the electrical current (Ibat2) flows from the electrical power generating device 14 to the second electrical power storage device 24b. Further, the electrical current (Ibat1) flows from the electrical power generating device 14 to the first electrical power storage device 24a. Both the first electrical power storage device 24a and the second electrical power storage device 24b are charged by the electrical power of the electrical power generating device 14, and as shown in FIG. 5A, the terminal voltage (Vbat1) of the first electrical power storage device 24a and the terminal voltage (Vbat2) of the second electrical power storage device 24b rise together.

[Starting Process of Electrical Power Supply System]

Figure 15:
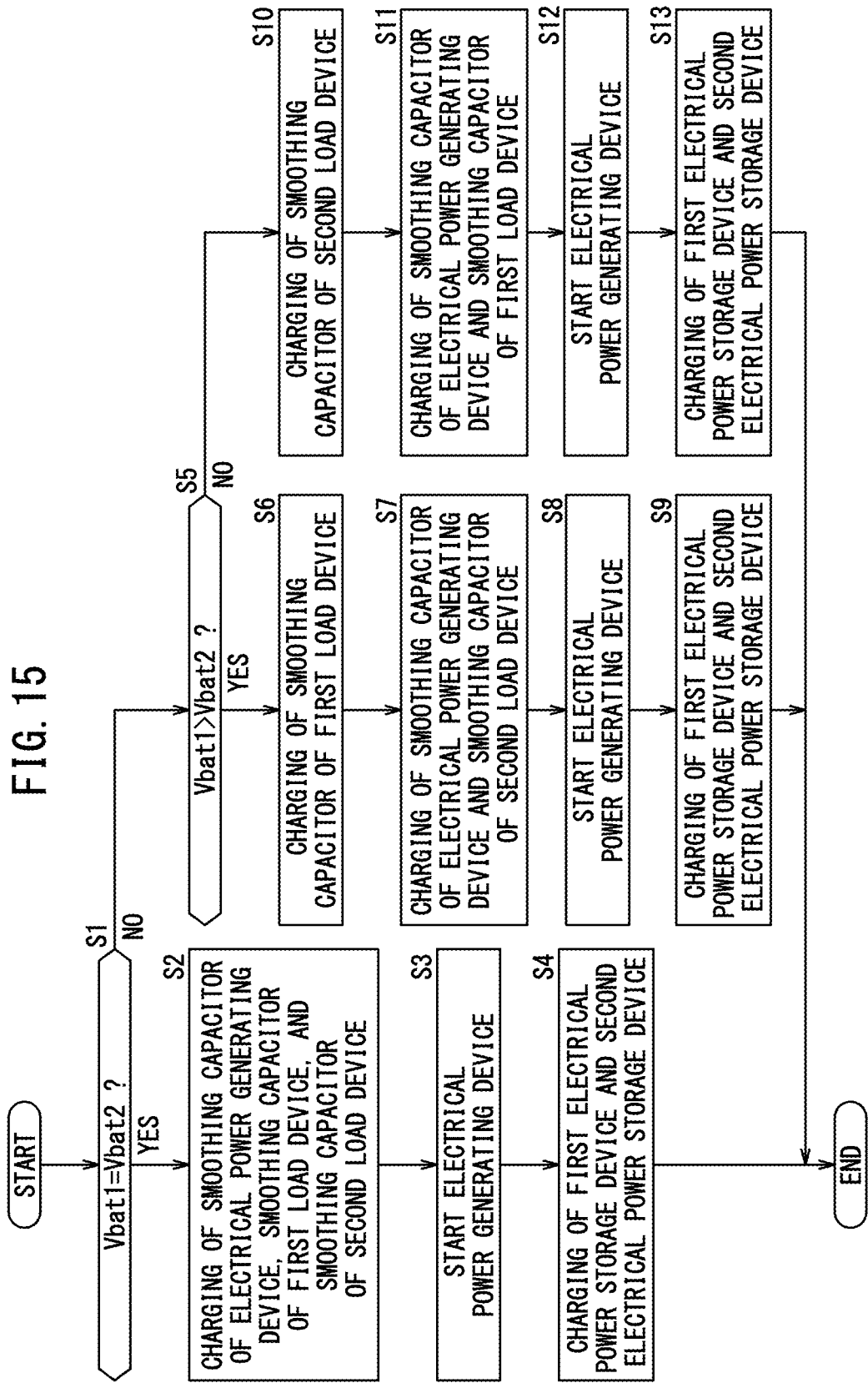
FIG. 15 is a flowchart showing a starting process of the electrical power supply system performed in the control device.

FIG. 15 is a flowchart showing a starting process of the electrical power supply system 10 performed in the control device 58.

In step S1, the control unit 66 determines whether or not the terminal voltage (Vbat1) of the first electrical power storage device 24a and the terminal voltage (Vbat2) of the second electrical power storage device 24b are equal to each other.

In step S1, in the case that the terminal voltage (Vbat1) of the first electrical power storage device 24a and the terminal voltage (Vbat2) of the second electrical power storage device 24b are determined to be equal to each other (step S1: YES), the process transitions to step S2.

In step S2, the control unit 66, together with setting the disconnection device 28a in the connected state (ON), sets the reverse flow prevention device 36a in the state of permitting the reverse flow. In accordance with this feature, the electrical power generating device 14 is connected to the first electrical power supply circuit 12a. Further, the control unit 66, together with setting the disconnection device 28b in the connected state (ON), sets the reverse flow prevention device 36b in the state of permitting the reverse flow. In accordance with this feature, the electrical power generating device 14 is connected to the second electrical power supply circuit 12b.

The control unit 66, together with setting the switching unit 48a in the connected state (ON), sets the switching unit 50a in the connected state (ON). In accordance with this feature, the first electrical power storage device 24a is connected via the precharging resistor 52a to the third electrical power supply circuit 22a. Further, the control unit 66, together with setting the switching unit 48b in the connected state (ON), sets the switching unit 50b in the connected state (ON). In accordance with this feature, the second electrical power storage device 24b is connected via the precharging resistor 52b to the fourth electrical power supply circuit 22b.

At this time, the smoothing capacitor 18 of the electrical power generating device 14 is charged by the electrical power of the first electrical power storage device 24a and the electrical power of the second electrical power storage device 24b. Further, the smoothing capacitor 20a of the first load device 16a is charged by the electrical power of the first electrical power storage device 24a. Furthermore, the smoothing capacitor 20b of the second load device 16b is charged by the electrical power of the second electrical power storage device 24b. When charging of the smoothing capacitor 18, the smoothing capacitor 20a, and the smoothing capacitor 20b is completed, the process proceeds to step S3.

In step S3, the control unit 66, together with setting the switching unit 46a in the connected state (ON), sets the switching unit 50a in the disconnected state (OFF). In accordance with this feature, the first electrical power storage device 24a is connected, but not via the precharging resistor 52a, to the third electrical power supply circuit 22a. Further, the control unit 66, together with setting the switching unit 46b in the connected state (ON), sets the switching unit 50b in the disconnected state (OFF). In accordance with this feature, the second electrical power storage device 24b is connected, but not via the precharging resistor 52b, to the fourth electrical power supply circuit 22b.

The control unit 66 causes the electrical power generating device 14 to be started by using the electrical power of the first electrical power storage device 24a and the electrical power of the second electrical power storage device 24b. When the electrical power generating device 14 starts generating electrical power, the process transitions to step S4.

In step S4, the control unit 66 sets the reverse flow prevention device 36a in the state of prohibiting the reverse flow. Further, the control unit 66 sets the reverse flow prevention device 36b in the state of prohibiting the reverse flow. The first electrical power storage device 24a and the second electrical power storage device 24b are charged by the electrical power of the electrical power generating device 14. Thereafter, the starting process of the electrical power supply system 10 comes to an end.

In step S1, in the case that the terminal voltage (Vbat1) of the first electrical power storage device 24a and the terminal voltage (Vbat2) of the second electrical power storage device 24b are determined to not be equal to each other (step S1: NO), the process transitions to step S5.

In step S5, the control unit 66 determines whether or not the terminal voltage (Vbat1) of the first electrical power storage device 24a is higher than the terminal voltage (Vbat2) of the second electrical power storage device 24b.

In step S5, in the case that the terminal voltage (Vbat1) of the first electrical power storage device 24a is determined to be higher than the terminal voltage (Vbat2) of the second electrical power storage device 24b (step S5: YES), the process transitions to step S6.

In step S6, the control unit 66 sets the disconnection device 28a in the connected state (ON). Further, the control unit 66 sets the disconnection device 28b in the connected state (ON). Furthermore, the control unit 66, together with setting the switching unit 48a in the connected state (ON), sets the switching unit 50a in the connected state (ON). In accordance with this feature, the first electrical power storage device 24a is connected via the precharging resistor 52a to the third electrical power supply circuit 22a. Therefore, the smoothing capacitor 20a of the first load device 16a is charged by the electrical power of the first electrical power storage device 24a. When charging of the smoothing capacitor 20a is completed, the control unit 66, together with setting the switching unit 46a in the connected state (ON), sets the switching unit 50a in the disconnected state (OFF). In accordance with this feature, the first electrical power storage device 24a is connected, but not via the precharging resistor 52a, to the third electrical power supply circuit 22a. Thereafter, the process transitions to step S7.

In step S7, the control unit 66 sets the reverse flow prevention device 36b in the state of permitting the reverse flow. In accordance with this feature, the electrical power generating device 14 is connected to the second electrical power supply circuit 12b. The control unit 66, together with setting the switching unit 48b in the connected state (ON), sets the switching unit 50b in the connected state (ON). In accordance with this feature, the second electrical power storage device 24b is connected via the precharging resistor 52b to the fourth electrical power supply circuit 22b.

At this time, the smoothing capacitor 18 of the electrical power generating device 14 is charged by the electrical power of the second electrical power storage device 24b. Further, the smoothing capacitor 20b of the second load device 16b is charged by the electrical power of the second electrical power storage device 24b. When charging of the smoothing capacitor 18 and the smoothing capacitor 20b is completed, the control unit 66, together with setting the switching unit 46b in the connected state (ON), sets the switching unit 50b in the disconnected state (OFF). In accordance with this feature, the second electrical power storage device 24b is connected, but not via the precharging resistor 52b, to the fourth electrical power supply circuit 22b. Thereafter, the process transitions to step S8. Moreover, it should be noted that the order of step S6 and step S7 may be reversed.

In step S8, the control unit 66 causes the electrical power generating device 14 to be started by using the electrical power of the second electrical power storage device 24b. When the electrical power generating device 14 starts generating electrical power, the process transitions to step S9.

In step S9, the control unit 66 sets the reverse flow prevention device 36b in the state of prohibiting the reverse flow. The second electrical power storage device 24b is charged by the electrical power of the electrical power generating device 14. After the terminal voltage (Vbat2) of the second electrical power storage device 24b has become equal to the terminal voltage (Vbat1) of the first electrical power storage device 24a, both of the first electrical power storage device 24a and the second electrical power storage device 24b are charged by the electrical power of the electrical power generating device 14. Thereafter, the starting process of the electrical power supply system 10 comes to an end.

In step S10, the control unit 66 sets the disconnection device 28a in the connected state (ON). Further, the control unit 66 sets the disconnection device 28b in the connected state (ON). Furthermore, the control unit 66, together with setting the switching unit 48b in the connected state (ON), sets the switching unit 50b in the connected state (ON). In accordance with this feature, the second electrical power storage device 24b is connected via the precharging resistor 52b to the fourth electrical power supply circuit 22b. Therefore, the smoothing capacitor 20b of the second load device 16b is charged by the electrical power of the second electrical power storage device 24b. When charging of the smoothing capacitor 20b is completed, the control unit 66, together with setting the switching unit 46b in the connected state (ON), sets the switching unit 50b in the disconnected state (OFF). In accordance with this feature, the second electrical power storage device 24b is connected, but not via the precharging resistor 52b, to the fourth electrical power supply circuit 22b. Thereafter, the process transitions to step S11.

In step S11, the control unit 66 sets the reverse flow prevention device 36a in the state of permitting the reverse flow. In accordance with this feature, the electrical power generating device 14 is connected to the first electrical power supply circuit 12a. The control unit 66, together with setting the switching unit 48a in the connected state (ON), sets the switching unit 50a in the connected state (ON). In accordance with this feature, the first electrical power storage device 24a is connected via the precharging resistor 52a to the third electrical power supply circuit 22a.

At this time, the smoothing capacitor 18 of the electrical power generating device 14 is charged by the electrical power of the first electrical power storage device 24a. Further, the smoothing capacitor 20a of the first load device 16a is charged by the electrical power of the first electrical power storage device 24a. When charging of the smoothing capacitor 18 and the smoothing capacitor 20a is completed, the control unit 66, together with setting the switching unit 46a in the connected state (ON), sets the switching unit 50a in the disconnected state (OFF). In accordance with this feature, the first electrical power storage device 24a is connected, but not via the precharging resistor 52a, to the third electrical power supply circuit 22a. Thereafter, the process transitions to step S12. Moreover, it should be noted that the order of step S10 and step S11 may be reversed.

In step S12, the control unit 66 causes the electrical power generating device 14 to be started by using the electrical power of the first electrical power storage device 24a. When the electrical power generating device 14 starts generating electrical power, the process transitions to step S13.

In step S13, the control unit 66 sets the reverse flow prevention device 36a in the state of prohibiting the reverse flow.

The first electrical power storage device 24a is charged by the electrical power of the electrical power generating device 14. After the terminal voltage (Vbat1) of the first electrical power storage device 24a has become equal to the terminal voltage (Vbat2) of the second electrical power storage device 24b, both of the first electrical power storage device 24a and the second electrical power storage device 24b are charged by the electrical power of the electrical power generating device 14. Thereafter, the starting process of the electrical power supply system 10 comes to an end.

Comparison with Comparative Example

According to the present embodiment, even in the case that there is a difference between the terminal voltage (Vbat1) of the first electrical power storage device 24a and the terminal voltage (Vbat2) of the second electrical power storage device 24b, it is possible to cause the electrical power supply system 10 to be started without generating an excessive electrical current in the electrical power supply system 10.

Figure 16A:
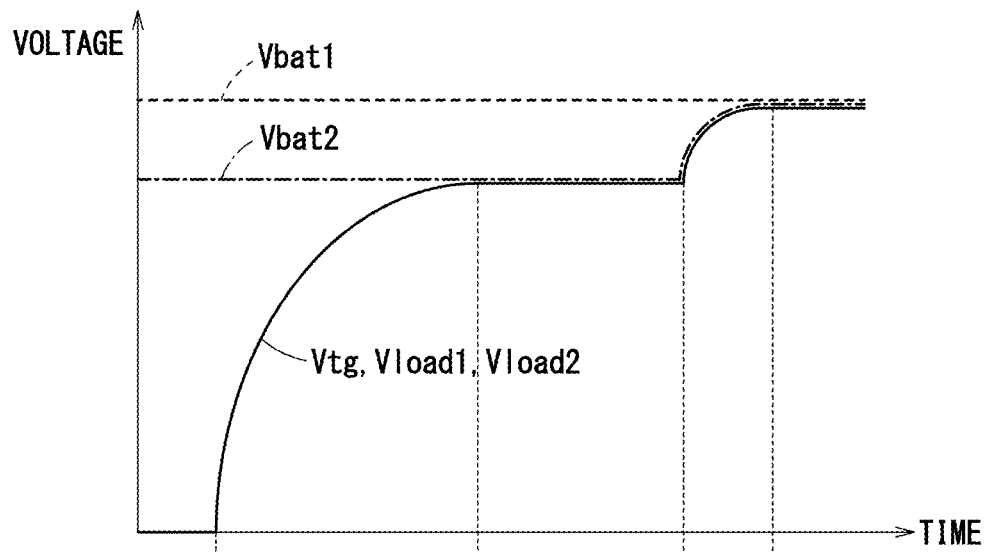
FIG. 16A is a time chart of a voltage in the electrical power supply system at a time of starting in a comparative example.
Figure 16B:
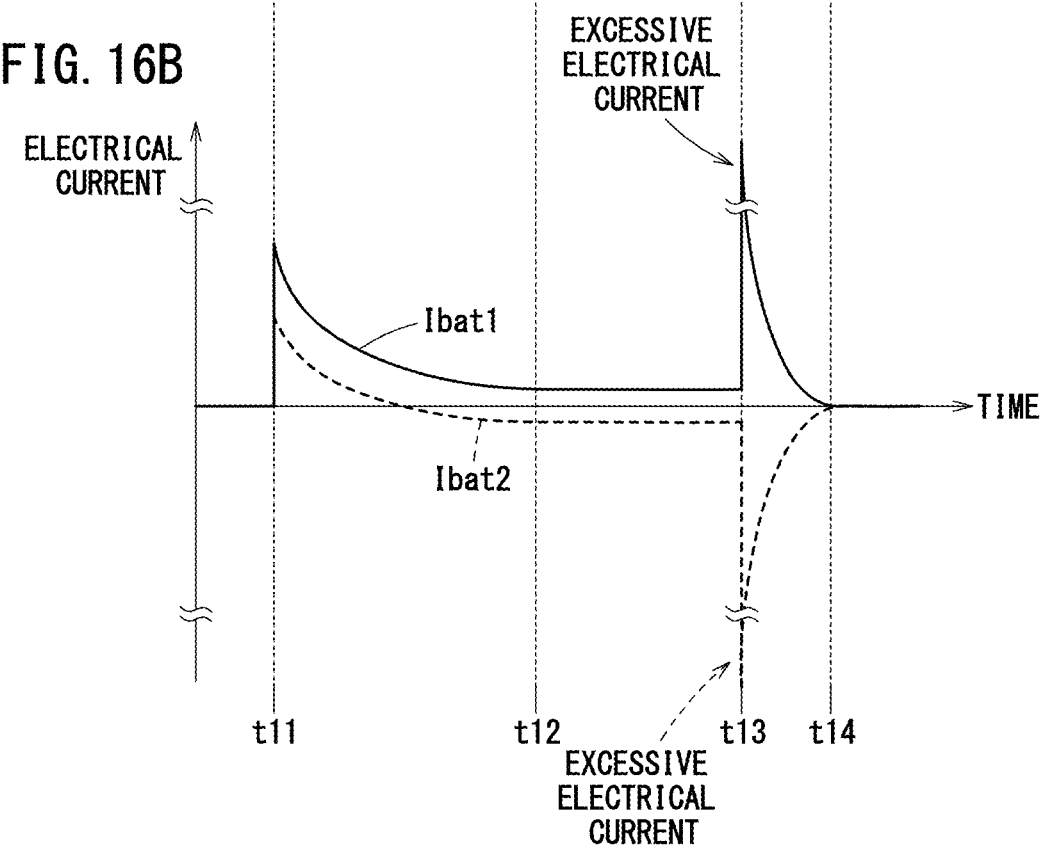
FIG. 16B is a time chart of an electrical current in the electrical power supply system at a time of starting in the comparative example.
Figure 18:
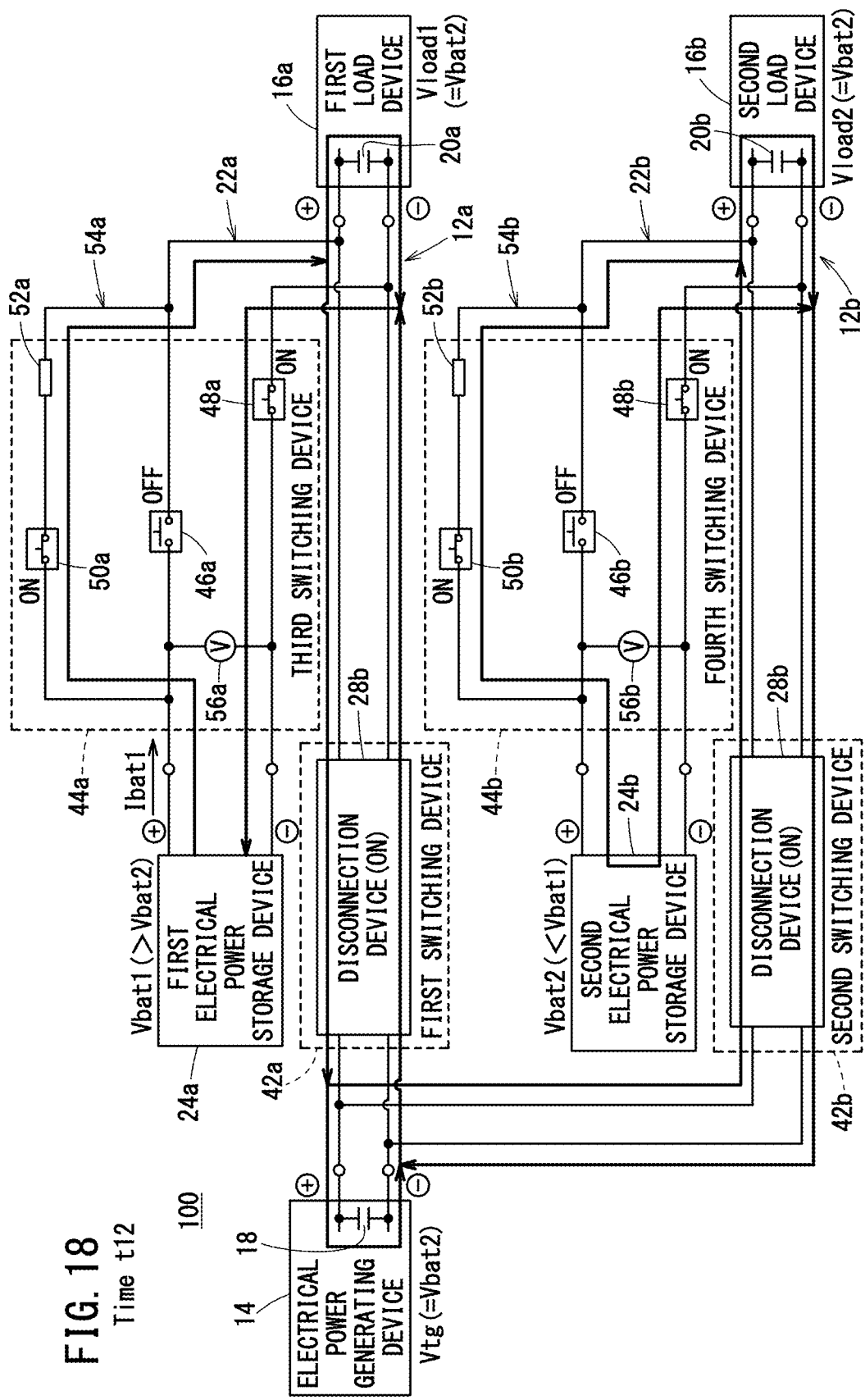
FIG. 18 is a diagram showing a state of the electrical power supply system according to the comparative example.
Figure 19:
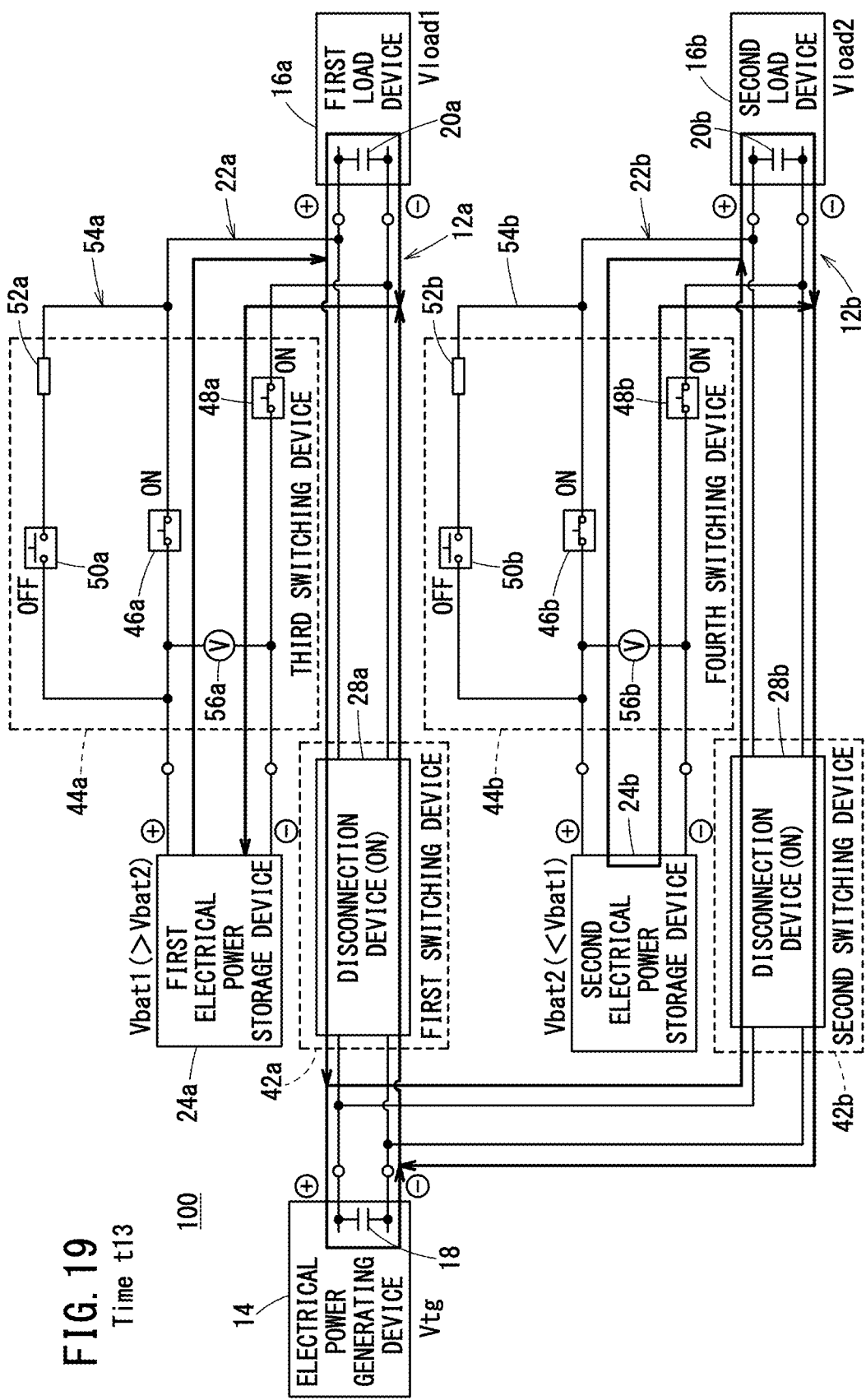
FIG. 19 is a diagram showing a state of the electrical power supply system according to the comparative example.

In order to facilitate understanding of the advantageous effects achieved by the present embodiment, a comparative example will be described. FIG. 16A is a time chart of a voltage in an electrical power supply system 100 at a time of starting in the comparative example. FIG. 16B is a time chart of an electrical current in the electrical power supply system 100 at a time of starting in the comparative example. FIG. 17 to FIG. 19 are diagrams showing states of the electrical power supply system 100 according to the comparative example. The electrical power supply system 100 according to the comparative example has the same configuration as the electrical power supply system 10 according to the present embodiment, except that the former does not include the reverse flow prevention device 36a and the reverse flow prevention device 36b.

Hereinafter, using FIG. 16A, FIG. 16B, and FIG. 17 to FIG. 19, a description will be given concerning the electrical power supply system 100 at a time of starting. At a point in time when the electrical power supply system 100 is started, it is assumed that the terminal voltage (Vbat1) of the first electrical power storage device 24a is higher than the terminal voltage (Vbat2) of the second electrical power storage device 24b.

FIG. 17 is a diagram showing a state of the electrical power supply system 100 at a time of starting of charging of the smoothing capacitor 18 of the electrical power generating device 14, the smoothing capacitor 20a of the first load device 16a, and the smoothing capacitor 20b of the second load device 16b (time t11). When the smoothing capacitor 18, the smoothing capacitor 20a, and the smoothing capacitor 20b are charged, the disconnection device 28a is set in the connected state (ON), and the disconnection device 28b is set in the connected state (ON). Further, the switching unit 46a is set in the disconnected state (OFF), the switching unit 48a is set in the connected state (ON), and the switching unit 50a is set in the connected state (ON). Furthermore, the switching unit 46b is set in the disconnected state (OFF), the switching unit 48b is set in the connected state (ON), and the switching unit 50b is set in the connected state (ON).

In accordance with this feature, the electrical power generating device 14 is connected via the precharging resistor 52a to the first electrical power storage device 24a. Further, the electrical power generating device 14 is connected via the precharging resistor 52b to the second electrical power storage device 24b. Therefore, the smoothing capacitor 18 is charged by the electrical power of the first electrical power storage device 24a and the electrical power of the second electrical power storage device 24b.

The first load device 16a is connected via the precharging resistor 52a to the first electrical power storage device 24a. Therefore, the smoothing capacitor 20a is charged by the electrical power of the first electrical power storage device 24a. The second load device 16b is connected via the precharging resistor 52b to the second electrical power storage device 24b. Therefore, the smoothing capacitor 20b is charged by the electrical power of the second electrical power storage device 24b.

At this time, as shown in FIG. 16B, the electrical current (Ibat1) flows from the first electrical power storage device 24a to the electrical power generating device 14 and the first load device 16a. Similarly, the electrical current (Ibat2) flows from the second electrical power storage device 24b to the electrical power generating device 14 and the second load device 16b. An electrical charge is gradually accumulated in the smoothing capacitor 18, the smoothing capacitor 20a, and the smoothing capacitor 20b. In accordance with this feature, as shown in FIG. 16A, the terminal voltage (Vtg) of the electrical power generating device 14, the terminal voltage (Vload1) of the first load device 16a, and the terminal voltage (Vload2) of the second load device 16b gradually rise. At time t12, the terminal voltage (Vtg) of the electrical power generating device 14, the terminal voltage (Vload1) of the first load device 16a, and the terminal voltage (Vload2) of the second load device 16b reach the same voltage as the terminal voltage (Vbat2) of the second electrical power storage device 24b.

After time t12, as shown in FIG. 18, the electrical current (Ibat1) flows from the first electrical power storage device 24a to the electrical power generating device 14, the first load device 16a, the second load device 16b, and the second electrical power storage device 24b. More specifically, together with the smoothing capacitor 18, the smoothing capacitor 20a, and the smoothing capacitor 20b being charged by the electrical power of the first electrical power storage device 24a, the second electrical power storage device 24b is also charged by the electrical power of the first electrical power storage device 24a.

If the charging by means of the electrical power of the first electrical power storage device 24a continues, the terminal voltage (Vtg) of the electrical power generating device 14, the terminal voltage (Vload1) of the first load device 16a, the terminal voltage (Vload2) of the second load device 16b, and the terminal voltage (Vbat2) of the second electrical power storage device 24b will become equal to the terminal voltage (Vbat1) of the first electrical power storage device 24a. However, since the charging speed of the second electrical power storage device 24b is comparatively slow, a long time period is required until the terminal voltage (Vtg) of the electrical power generating device 14, the terminal voltage (Vload1) of the first load device 16a, the terminal voltage (Vload2) of the second load device 16b, and the terminal voltage (Vbat2) of the second electrical power storage device 24b become equal to the terminal voltage (Vbat1) of the first electrical power storage device 24a.

At time t13, which is prior to the terminal voltage Vbat1 becoming equal to the terminal voltage Vbat2 (Vbat1=Vbat2), it is assumed that the third switching device 44a connects the first electrical power storage device 24a, but not via the precharging resistor 52a, to the third electrical power supply circuit 22a, as shown in FIG. 19. Further, at time t13, it is assumed that the fourth switching device 44b connects the second electrical power storage device 24b, but not via the precharging resistor 52b, to the fourth electrical power supply circuit 22b.

In this case, the first electrical power storage device 24a becomes connected, but not via any resistor, to the electrical power generating device 14, the first load device 16a, the second load device 16b, and the second electrical power storage device 24b. Therefore, as shown in FIG. 16B, an excessive electrical current is generated. At this time, as shown in FIG. 16A, the terminal voltage (Vbat2) of the second electrical power storage device 24b suddenly rises to the same voltage as the terminal voltage (Vbat1) of the first electrical power storage device 24a (at time t14).

As noted previously, according to the comparative example, in the case that there is a difference between the terminal voltage (Vbat1) of the first electrical power storage device 24a and the terminal voltage (Vbat2) of the second electrical power storage device 24b, a concern arises in that, when the electrical power supply system 100 is operated, an excessive electrical current may be generated in the electrical power supply system 100. On the other hand, according to the present embodiment, even in the case that there is a difference between the terminal voltage (Vbat1) of the first electrical power storage device 24a and the terminal voltage (Vbat2) of the second electrical power storage device 24b, it is possible to cause the electrical power supply system 10 to be started without generating an excessive electrical current in the electrical power supply system 10.

[Example of Using Electrical Power Supply System]

FIG. 20 is a schematic diagram of a moving object 70. The electrical power supply system 10 can be mounted in the moving object 70. The moving object 70, for example, is an electric vertical take-off and landing aircraft (eVTOL aircraft). The moving object 70 is equipped with eight VTOL rotors 72. The VTOL rotors 72 generate an upwardly directed thrust with respect to a fuselage 74. The moving object 70 is equipped with eight electric motors 76. One of the electric motors 76 drives one of the VTOL rotors 72. The moving object 70 includes two cruise rotors 78. The cruise rotors 78 generate a forwardly directed thrust with respect to the fuselage 74. The moving object 70 is equipped with four electric motors 80. Two of the electric motors 80 drive one of the cruise rotors 78.

Each of the first load device 16a and the second load device 16b may be equipped with at least one of a plurality of the electric motors 76 and a plurality of the electric motors 80. Each of the first load device 16*a* and the second load device 16*b*, in addition to the electric motors 76 and the electric motors 80, may be equipped with a low voltage driving device.

The moving object 70 is not limited to being an aircraft, but may be a ship, an automobile, a train, or the like. Further, in addition to the moving object 70, the electrical power supply system 10 may be used in facilities, factories, and the like.

In relation to the above-described disclosure, the following supplementary notes are further disclosed.

Supplementary Note 1

The electrical power supply system (10) of the present disclosure comprises the first load device (16*a*) including the smoothing capacitor (20*a*), the second load device (16*b*) including the smoothing capacitor (20*b*), the electrical power generating device (14) which includes the smoothing capacitor (18) and which supplies electrical power to the first load device and the second load device, the first electrical power storage device (24*a*) which is connected in parallel with the electrical power generating device, and which supplies electrical power to the first load device, the second electrical power storage device (24*b*) which is connected in parallel with the electrical power generating device, and which supplies electrical power to the second load device, the first switching device (42*a*) that switches between the first state in which, together with the electrical power generating device and the first load device being electrically connected, the electrical power generating device and the first electrical power storage device are electrically connected, and the second state in which, together with the electrical power generating device and the first load device being electrically disconnected, the electrical power generating device and the first electrical power storage device are electrically disconnected, the second switching device (42*b*) that switches between the third state in which, together with the electrical power generating device and the second load device being electrically connected, the electrical power generating device and the second electrical power storage device are electrically connected, and the fourth state in which, together with the electrical power generating device and the second load device being electrically disconnected, the electrical power generating device and the second electrical power storage device are electrically disconnected, the voltage acquisition unit (64) that acquires the first voltage which is the terminal voltage of the first electrical power storage device, and the second voltage which is the terminal voltage of the second electrical power storage device, and the control unit (66) that controls the first switching device and the second switching device, wherein, in the case that the first voltage is higher than the second voltage, the control unit sets the first switching device to the second state, and sets the second switching device to the third state, thereby charging the smoothing capacitor of the first load device by the electrical power supplied from the first electrical power storage device, and charging the smoothing capacitor of the electrical power generating device and the smoothing capacitor of the second load device by the electrical power supplied from the second electrical power storage device. In accordance with such features, without generating an excessive electrical current in the electrical power supply system, the electrical power supply system can be started.

Supplementary Note 2

In the electrical power supply system according to Supplementary Note 1, in the case that the charging of the smoothing capacitor of the electrical power generating device is completed, the control unit may start the electrical power generating device by the electrical power supplied from the second electrical power storage device. In accordance with this feature, the electrical power generating device can be made to start.

Supplementary Note 3

In the electrical power supply system according to Supplementary Note 2, in the case that starting of the electrical power generating device is completed, the control unit may charge the second electrical power storage device by the electrical power supplied from the electrical power generating device. In accordance with this feature, it is possible to charge the second electrical power storage device by the electrical power generated in the electrical power generating device.

Supplementary Note 4

In the electrical power supply system according to Supplementary Note 1, in the case that the first switching device is in the second state, the first switching device may permit the supply of the electrical power from the electrical power generating device to the first electrical power storage device at a time when the terminal voltage of the electrical power generating device is higher than the first voltage. In accordance with this feature, it is possible to charge the first electrical power storage device by the electrical power generated in the electrical power generating device.

Supplementary Note 5

The electrical power supply system according to Supplementary Note 1 may further comprise the third switching device (44*a*) that switches between the state in which the first electrical power storage device and the first load device are electrically connected via the first precharging resistor (52*a*), and the state in which the first electrical power storage device and the first load device are electrically connected but not via the first precharging resistor, the fourth switching device (44*b*) that switches between the state in which the second electrical power storage device and the second load device are electrically connected via the second precharging resistor (52*b*), and the state in which the second electrical power storage device and the second load device are electrically connected but not via the second precharging resistor, wherein, in the case that the smoothing capacitor of the first load device is charged by the electrical power supplied from the first electrical power storage device, the control unit may set the third switching device to the state in which the first electrical power storage device and the first load device are electrically connected via the first precharging resistor, in the case that the first load device is driven by the electrical power supplied from the first electrical power storage device, the control unit may set the third switching device to the state in which the first electrical power storage device and the first load device are electrically connected but not via the first precharging resistor, in the case that the smoothing capacitor of the second load device is charged by the electrical power supplied from the second electrical power storage device, the control unit may set the fourth switching device to the state in which the second electrical power storage device and the second load device are electrically connected via the second precharging resistor, and in the case that the second load device is driven by the electrical power supplied from the second electrical power storage device, the control unit may set the fourth switching device to the state in which the second electrical power storage device and the second load device are electrically connected but not via the second precharging resistor. In accordance with such features, without generating an excessive electrical current in the electrical power supply system, the smoothing capacitor of the first load device can be charged. Further, without generating an excessive electrical current in the electrical power supply system, the smoothing capacitor of the second load device can be charged.

Supplementary Note 6

The method of controlling the electrical power supply system of the present disclosure is a method of controlling the electrical power supply system that comprises the first load device including the smoothing capacitor, the second load device including the smoothing capacitor, the electrical power generating device which includes the smoothing capacitor, and which supplies electrical power to the first load device and the second load device, the first electrical power storage device which is connected in parallel with the electrical power generating device, and which supplies electrical power to the first load device, the second electrical power storage device which is connected in parallel with the electrical power generating device, and which supplies electrical power to the second load device, the first switching device that switches between the first state in which, together with the electrical power generating device and the first load device being electrically connected, the electrical power generating device and the first electrical power storage device are electrically connected, and the second state in which, together with the electrical power generating device and the first load device being electrically disconnected, the electrical power generating device and the first electrical power storage device are electrically disconnected, and the second switching device that switches between the third state in which, together with the electrical power generating device and the second load device being electrically connected, the electrical power generating device and the second electrical power storage device are electrically connected, and the fourth state in which, together with the electrical power generating device and the second load device being electrically disconnected, the electrical power generating device and the second electrical power storage device are electrically disconnected, the method of controlling the electrical power supply system comprising the voltage acquisition step of acquiring the first voltage which is the terminal voltage of the first electrical power storage device, and the second voltage which is the terminal voltage of the second electrical power storage device, and the precharging step in which, in the case that the first voltage is higher than the second voltage, the first switching device is set to the second state, and the second switching device is set to the third state, thereby charging the smoothing capacitor of the first load device by the electrical power supplied from the first electrical power storage device, and charging the smoothing capacitor of the electrical power generating device and the smoothing capacitor of the second load device by the electrical power supplied from the second electrical power storage device. In accordance with such features, without generating an excessive electrical current in the electrical power supply system, the electrical power supply system can be started.

Although concerning the present disclosure, a detailed description thereof has been presented above, the present disclosure is not necessarily limited to the individual embodiments described above. These embodiments may be subjected to various additions, substitutions, modifications, partial deletions and the like, within a range that does not deviate from the essence and gist of the present disclosure, or the gist of the present disclosure as derived from the contents described in the claims and equivalents thereof. Further, these embodiments can also be implemented together in combination. For example, in the above-described embodiments, the order of the operations and the order of the processes are illustrated as examples, and the present disclosure is not necessarily limited to these features. The same also applies to cases in which numerical values or mathematical expressions are used in the description of the aforementioned embodiments.

The invention claimed is:

1. An electrical power supply system, comprising:
a first load device including a smoothing capacitor;
a second load device including a smoothing capacitor;
an electrical power generating device including a smoothing capacitor, and configured to supply electrical power to the first load device and the second load device;
a first electrical power storage device connected in parallel with the electrical power generating device, and configured to supply electrical power to the first load device;
a second electrical power storage device connected in parallel with the electrical power generating device, and configured to supply electrical power to the second load device;
a first switching device configured to switch between a first state in which, together with the electrical power generating device and the first load device being electrically connected, the electrical power generating device and the first electrical power storage device are electrically connected, and a second state in which, together with the electrical power generating device and the first load device being electrically disconnected, the electrical power generating device and the first electrical power storage device are electrically disconnected;
a second switching device configured to switch between a third state in which, together with the electrical power generating device and the second load device being electrically connected, the electrical power generating device and the second electrical power storage device are electrically connected, and a fourth state in which, together with the electrical power generating device and the second load device being electrically disconnected, the electrical power generating device and the second electrical power storage device are electrically disconnected; and
a control device comprising one or more processors that execute computer-executable instructions stored in a memory,
wherein the one or more processors execute the computer-executable instructions to cause the control device to:
acquire a first voltage which is a terminal voltage of the first electrical power storage device, and a second voltage which is a terminal voltage of the second electrical power storage device; and
in a case that the first voltage is higher than the second voltage, set the first switching device to the second state and set the second switching device to the third state, thereby charging the smoothing capacitor of the first load device by the electrical power supplied from the first electrical power storage device, and charging the smoothing capacitor of the electrical power generating device and the smoothing capacitor of the second load device by the electrical power supplied from the second electrical power storage device.

2. The electrical power supply system according to claim 1, wherein, in a case that charging of the smoothing capacitor of the electrical power generating device is completed, the one or more processors cause the control device to start the electrical power generating device by the electrical power supplied from the second electrical power storage device.

3. The electrical power supply system according to claim 2, wherein, in a case that starting of the electrical power generating device is completed, the one or more processors cause the control device to charge the second electrical power storage device by the electrical power supplied from the electrical power generating device.

4. The electrical power supply system according to claim 1, wherein, in a case that the first switching device is in the second state, the first switching device permits supply of the electrical power from the electrical power generating device to the first electrical power storage device at a time when a terminal voltage of the electrical power generating device is higher than the first voltage.

5. The electrical power supply system according to claim 1, further comprising:
   a third switching device configured to switch between a state in which the first electrical power storage device and the first load device are electrically connected via a first precharging resistor, and a state in which the first electrical power storage device and the first load device are electrically connected but not via the first precharging resistor; and
   a fourth switching device configured to switch between a state in which the second electrical power storage device and the second load device are electrically connected via a second precharging resistor, and a state in which the second electrical power storage device and the second load device are electrically connected but not via the second precharging resistor,
   wherein, in a case that the smoothing capacitor of the first load device is charged by the electrical power supplied from the first electrical power storage device, the one or more processors cause the control device to set the third switching device to the state in which the first electrical power storage device and the first load device are electrically connected via the first precharging resistor,
   in a case that the first load device is driven by the electrical power supplied from the first electrical power storage device, the one or more processors cause the control device to set the third switching device to the state in which the first electrical power storage device and the first load device are electrically connected but not via the first precharging resistor,
   in a case that the smoothing capacitor of the second load device is charged by the electrical power supplied from the second electrical power storage device, the one or more processors cause the control device to set the fourth switching device to the state in which the second electrical power storage device and the second load device are electrically connected via the second precharging resistor, and
   in a case that the second load device is driven by the electrical power supplied from the second electrical power storage device, the one or more processors cause the control device to set the fourth switching device to the state in which the second electrical power storage device and the second load device are electrically connected but not via the second precharging resistor.

6. A method of controlling an electrical power supply system,
   the electrical power supply system comprising:
   a first load device including a smoothing capacitor;
   a second load device including a smoothing capacitor;
   an electrical power generating device including a smoothing capacitor, and configured to supply electrical power to the first load device and the second load device;
   a first electrical power storage device connected in parallel with the electrical power generating device, and configured to supply electrical power to the first load device;
   a second electrical power storage device connected in parallel with the electrical power generating device, and configured to supply electrical power to the second load device;
   a first switching device configured to switch between a first state in which, together with the electrical power generating device and the first load device being electrically connected, the electrical power generating device and the first electrical power storage device are electrically connected, and a second state in which, together with the electrical power generating device and the first load device being electrically disconnected, the electrical power generating device and the first electrical power storage device are electrically disconnected; and
   a second switching device configured to switch between a third state in which, together with the electrical power generating device and the second load device being electrically connected, the electrical power generating device and the second electrical power storage device are electrically connected, and a fourth state in which, together with the electrical power generating device and the second load device being electrically disconnected, the electrical power generating device and the second electrical power storage device are electrically disconnected,
   the method of controlling the electrical power supply system comprising:
   acquiring a first voltage which is a terminal voltage of the first electrical power storage device, and a second voltage which is a terminal voltage of the second electrical power storage device; and
   in a case that the first voltage is higher than the second voltage, setting the first switching device to the second state and setting the second switching device to the third state, thereby charging the smoothing capacitor of the first load device by the electrical power supplied from the first electrical power storage device, and charging the smoothing capacitor of the electrical power generating device and the smoothing capacitor of the second load device by the electrical power supplied from the second electrical power storage device.

* * * * *